US010372296B2

(12) United States Patent
Hatada

(10) Patent No.: US 10,372,296 B2
(45) Date of Patent: Aug. 6, 2019

(54) INFORMATION PROCESSING APPARATUS, COMPUTER-READABLE RECORDING MEDIUM, AND INFORMATION PROCESSING METHOD

(71) Applicant: FUJITSU LIMITED, Kawasaki-shi, Kanagawa (JP)

(72) Inventor: Koki Hatada, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 184 days.

(21) Appl. No.: 15/276,954

(22) Filed: Sep. 27, 2016

(65) Prior Publication Data

US 2017/0255346 A1    Sep. 7, 2017

(30) Foreign Application Priority Data

Mar. 2, 2016   (JP) ................................ 2016-040482

(51) Int. Cl.
| | | |
|---|---|---|
| *G06F 3/0484* | (2013.01) | |
| *G06F 3/0481* | (2013.01) | |
| *G06F 3/0486* | (2013.01) | |
| *G06F 3/0488* | (2013.01) | |
| *G06F 3/0482* | (2013.01) | |

(52) U.S. Cl.
CPC .......... *G06F 3/0482* (2013.01); *G06F 3/0486* (2013.01); *G06F 3/04812* (2013.01); *G06F 3/04883* (2013.01)

(58) Field of Classification Search
CPC .. G06F 3/0482; G06F 3/04812; G06F 3/0486; G06F 3/04883
See application file for complete search history.

(56) References Cited

U.S. PATENT DOCUMENTS

| | | | |
|---|---|---|---|
| 6,694,056 B1 | 2/2004 | Ito et al. | |
| 8,743,070 B2 * | 6/2014 | Goto | G06F 3/0488 345/173 |
| 2003/0179235 A1 | 9/2003 | Saund et al. | |
| 2007/0188482 A1 * | 8/2007 | Fujimori | G06F 3/0481 345/204 |
| 2010/0146451 A1 * | 6/2010 | Jun-Dong | G06F 3/0482 715/841 |

(Continued)

FOREIGN PATENT DOCUMENTS

| | | |
|---|---|---|
| JP | 05-061596 | 3/1993 |
| JP | 06-161698 | 6/1994 |

(Continued)

OTHER PUBLICATIONS

"Wilders Security Forum—When I Drag an Icon on My Desktop, It Creates a Duplicate Copy of the Dragged Copy", published to web on May 7, 2013 to https://www.wildernesssecurity.com/threads/when-i-drag-an-icon-on-my-desktop-it-creates-a-duplicate-copy-of-the-dragged-icon.346685, retrieved Dec. 7, 2018.*

*Primary Examiner* — Shourjo Dasgupta
(74) *Attorney, Agent, or Firm* — Fujitsu Patent Center

(57) ABSTRACT

An information processing apparatus includes a menu item selection operation decision unit that selects a menu item in a context menu; a target selection operation decision unit that selects, regarding the selected menu item, an end position that is the result of a movement due to a predetermined operation; and a command calculation unit that calculates, on the basis of the selected end position, a command indicated by the menu item.

7 Claims, 20 Drawing Sheets

(56) References Cited

U.S. PATENT DOCUMENTS

| | | | |
|---|---|---|---|
| 2013/0219433 A1 | 8/2013 | Arai | |
| 2013/0246970 A1* | 9/2013 | Helle | G06F 3/0482 715/822 |
| 2014/0152586 A1* | 6/2014 | Terunuma | G06F 3/0482 345/173 |
| 2014/0215401 A1* | 7/2014 | Kim | G06F 3/0482 715/835 |
| 2015/0042584 A1* | 2/2015 | Lee | G06T 11/60 345/173 |
| 2016/0370958 A1* | 12/2016 | Tsuji | G06F 3/0488 |
| 2016/0378318 A1* | 12/2016 | Tsuju | G06F 3/0488 715/835 |

FOREIGN PATENT DOCUMENTS

| | | |
|---|---|---|
| JP | 08-180138 | 7/1996 |
| JP | 2001-184458 | 7/2001 |
| JP | 2003-296012 | 10/2003 |
| JP | 2015-038666 | 2/2015 |

\* cited by examiner

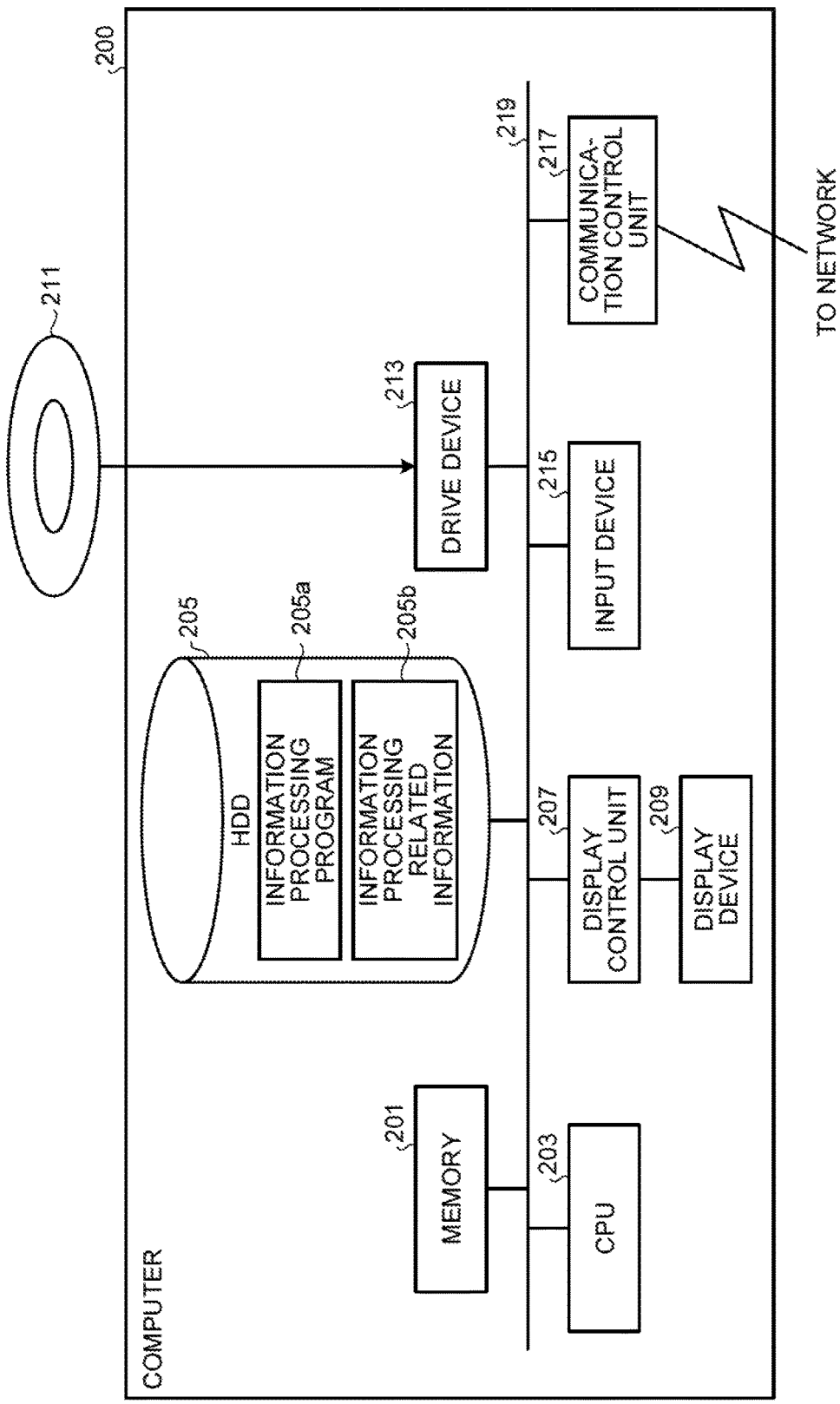

INFORMATION PROCESSING APPARATUS, COMPUTER-READABLE RECORDING MEDIUM, AND INFORMATION PROCESSING METHOD

CROSS-REFERENCE TO RELATED APPLICATION

This application is based upon and claims the benefit of priority of the prior Japanese Patent Application No. 2016-040482, filed on Mar. 2, 2016, the entire contents of which are incorporated herein by reference.

FIELD

The embodiments discussed herein are related to an information processing apparatus, or the like.

BACKGROUND

There is a known technology that displays, in an overlapped manner on a screen when a pointing is performed on a screen by an operation tool, such as a mouse, a touch, or the like, an operation menu related to the pointed target near the pointed position. When a user selects a single menu item in the displayed operation menus, the command related to the pointed target is determined and executed by the selected on the basis of the selected menu item. This type of operation menu is typically referred to as a "context menu". The context menu is widely used as a user interface of application in a typical personal computer (PC) or an application subjected to a touch operation performed by a tablet, a smart phone, or the like.

Patent Document 1: Japanese Laid-open Patent Publication No. 2001-184458

Patent Document 2: Japanese Laid-open Patent Publication No. 08-180138

Patent Document 3: Japanese Laid-open Patent Publication No. 05-061596

However, there is a problem in that, if objects displayed on a screen are densely packed, an operation to display a context menu is not able to be efficiently performed. Furthermore, in another point of view, there is a problem in that, if objects displayed on a screen are densely packed, even if a context menu is displayed, the visibility of the objects that have already been displayed is decreased.

For example, if objects displayed on a screen are densely packed, the area of the screen with no object is small, it is difficult for a user to perform a pointing by avoiding the object. Consequently, a pointing operation to display a context menu is not able to be efficiently performed.

Furthermore, even if a context menu is displayed, because the context menu is displayed on the screen in an overlapped manner, the context menu may possibly hide the already displayed objects. Thus, even if a context menu is displayed, there may be a case of decreasing the visibility of the already displayed objects.

SUMMARY

According to an aspect of an embodiment, an information processing apparatus includes a processor. The processor executes a process. The process includes first selecting a menu item in a context menu. The process includes second selecting, regarding the menu item selected at the first selecting, an end position that is a result of a movement due to a predetermined operation. The process includes displaying, at the end position selected at the second selecting, a content indicated by the menu item.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 20 is a schematic diagram illustrating an example of a computer that executes an information processing program.

DESCRIPTION OF EMBODIMENTS

Preferred embodiments of the present invention will be explained with reference to accompanying drawings. The present invention is not limited to the embodiments.

[a] First Embodiment

Figure 1:
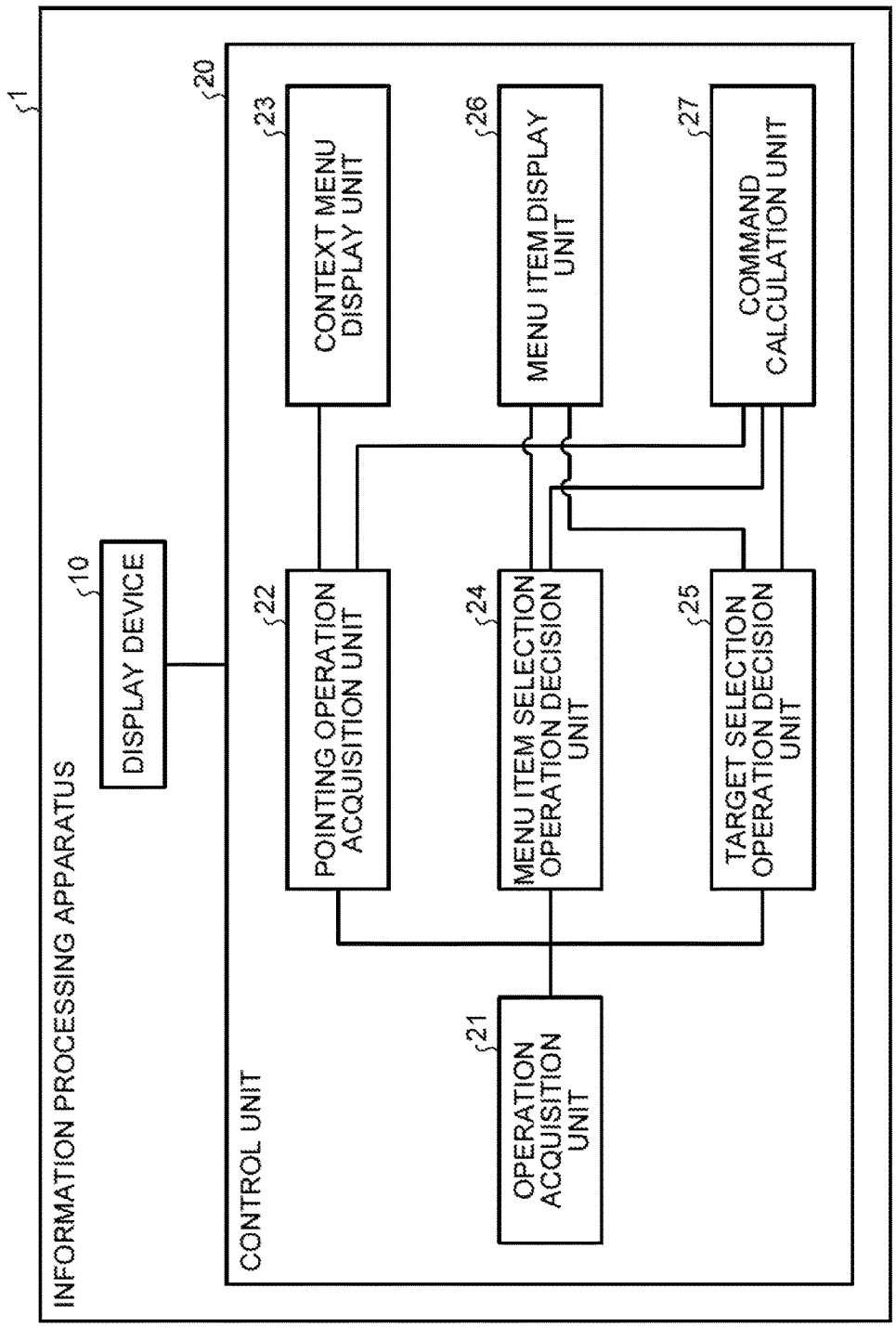
FIG. 1 is a functional block diagram illustrating the configuration of an information processing apparatus according to a first embodiment.

Configuration of an Information Processing Apparatus According to a First Embodiment FIG. 1 is a functional block diagram illustrating the configuration of an information processing apparatus according to a first embodiment. An information processing apparatus 1 according to the first embodiment simultaneously selects, after displaying a context menu, by detecting a predetermined operation of the menu item selected in the context menu, the command indicated by the menu item and the position at which the subject command is executed and then executes the command at the selected position. The predetermined operation mentioned here is, for example, a drag operation or a pointing operation. Hereinafter, a description will be given by using the predetermined operation as the drag operation.

As illustrated in FIG. 1, the information processing apparatus 1 includes a display device 10 and a control unit 20. The display device 10 may be, for example, a device with a display screen, such as a monitor of a personal computer (PC), a monitor of a television, a projector, a head mounted display (HMD), a smartphone, a tablet, or the like.

The control unit 20 includes an internal memory that stores therein control data and programs in which various kinds of procedures are prescribed, whereby the control unit 20 executes various kinds of processes. Furthermore, the control unit 20 corresponds to, for example, an electronic circuit in an integrated circuit, such as an application specific integrated circuit (ASIC), a field programmable gate array (FPGA), or the like. Alternatively, the control unit 20 corresponds to an electronic circuit, such as a central processing unit (CPU), a micro processing unit (MPU), or the like. Furthermore, the control unit 20 includes an operation acquisition unit 21, a pointing operation acquisition unit 22, a context menu display unit 23, a menu item selection operation decision unit 24, a target selection operation decision unit 25, a menu item display unit 26, and a command calculation unit 27.

The operation acquisition unit 21 acquires an operation performed on a user's screen. The user performs an operation to the screen using a mouse or a touch panel. The operation mentioned here includes, for example, a click of a mouse, a movement of a mouse pointer, a touchdown, a touch-up, and a movement of a touch position.

The pointing operation acquisition unit 22 acquires, from the operation acquired by the operation acquisition unit 21, a pointing operation to the screen. For example, if the operation acquired by the operation acquisition unit 21 is a click, the pointing operation acquisition unit 22 acquires the position in which a click operation is performed and then acquires the status as the pointing operation performed to the acquired position. Furthermore, if the operation acquired by the operation acquisition unit 21 is a touch-up, first, the pointing operation acquisition unit 22 acquires the position in which a touchdown is performed and then acquires the operation as the pointing operation to the acquired position. Then, when the pointing operation acquisition unit 22 acquires the pointing operation, if an object is displayed at the pointing position, the pointing operation acquisition unit 22 sets the displayed object to the target for the pointing. If no object is displayed at the pointing position, the pointing operation acquisition unit 22 sets a canvas of the screen to the target for the pointing.

If a pointing operation is acquired by the pointing operation acquisition unit 22, the context menu display unit 23 displays a context menu, in the vicinity of the pointing position, that is used to select an operation related to the target for the pointing. In the context menu, for example, menu items are vertically aligned in a straight line; however, the menu item may also be horizontally aligned in a straight line, or may also be a circularly menu item. Furthermore, on the basis of the target for the pointing, the context menu display unit 23 decides the menu item included in the context menu. For example, if the target for the pointing is a canvas, the context menu display unit 23 displays the context menu including the menu items of an "addition of a label" and a "change in a color". If the target for the pointing is a label, the context menu display unit 23 displays the context menu by including the menu items of a "deletion of a label" and a "change in a color".

The menu item selection operation decision unit 24 detects a first operation that is used to select a menu item in the context menu. The first operation is, for example, an operation to select a menu item and to start a drag.

The target selection operation decision unit 25 detects a second operation that is used to select the target in which the command indicated by the menu item is executed. The target mentioned here is, for example, the position in which the command is executed. The second operation is, for example, an operation to end the drag.

The menu item display unit 26 displays, in accordance with the drag operation, the menu item selected by the first operation. Namely, the menu item display unit 26 changes, on the basis of the drag operation, the display position of the menu item selected by the first operation.

On the basis of the menu item selected by the first operation, on the basis of the target selected by the second operation, and on the basis of the second operation, the command calculation unit 27 calculates the command to be executed. For example, it is assumed that the menu item of the "addition of a label" that is included in the context menu and that is displayed when a canvas on a screen is targeted for the pointing is selected by an operation to start a drag. Then, if the drag of the menu item of the selected "addition of a label" is started and the drag is ended at an arbitrary position, the command calculation unit 27 calculates a command to add the label at the position in which the drag has been ended. Furthermore, if the second operation is not performed, the command calculation unit 27 may calculate a command to add a label at the pointing position of the pointing that is performed in order to display the context menu acquired by the pointing operation acquisition unit 22.

Example of a Menu Operation Process

Figure 2:
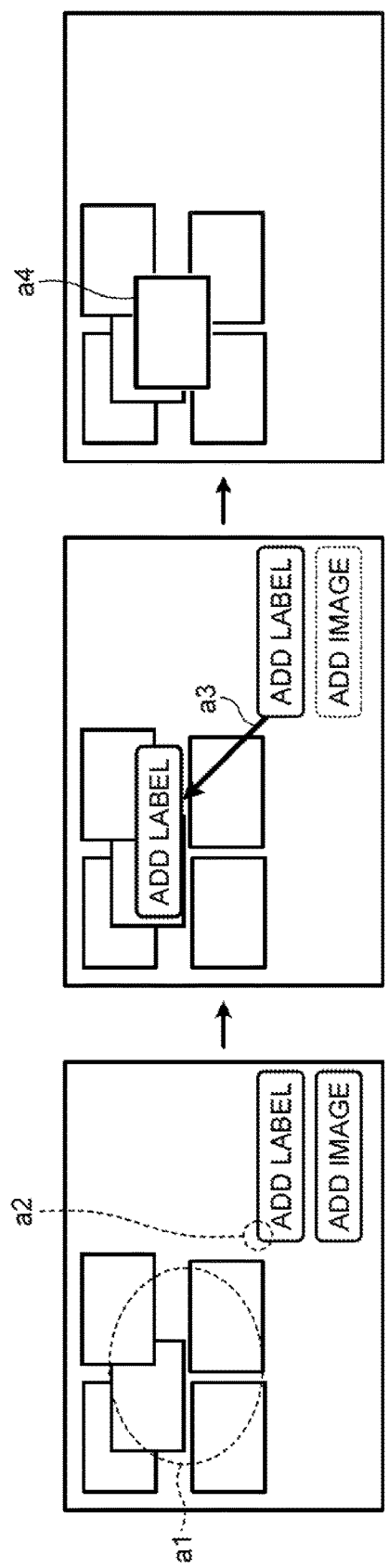
FIG. 2 is a schematic diagram illustrating an example of a menu operation process according to the first embodiment.

An example of a menu operation process according to the first embodiment will be described with reference to FIG. 2. FIG. 2 is a schematic diagram illustrating an example of a menu operation process according to the first embodiment. As illustrated in FIG. 2, it is assumed that the area indicated by a reference numeral a1 is an area in which objects are densely packed.

In this state, it is assumed that pointing is performed at the position that is indicated by a reference numeral a2 and that is easily tapped. Then, because no object is displayed on the pointing position, the pointing operation acquisition unit 22 sets the canvas on the screen to the target for the pointing. Then, when a pointing operation is acquired by the pointing operation acquisition unit 22, the context menu display unit 23 displays a context menu near the pointing position. Here, in the context menu, the menu items of an "addition of a label" and an "addition of an image" are included.

Then, it is assumed that the menu item of the "addition of a label" is selected and a drag a3 is started. Then, the menu item selection operation decision unit 24 detects the first operation that is used to select the menu item of the "addition of a label". Here, the first operation is an operation to start a drag. The menu item display unit 26 changes, on the basis of the drag operation, the display position of the menu item of the "addition of a label".

Then, it is assumed that the drag a3 of the menu item of the "addition of a label" has been ended. Then, the target selection operation decision unit 25 detects the second operation that is used to select the position in which the command indicated by the menu item of the "addition of a label" is executed. Here, the second operation is an operation to end the drag.

Then, the command calculation unit 27 calculates the command indicated by the menu item of the "addition of a label" at the position in which the drag a3 has been ended. Here, the command calculation unit 27 calculates the command to perform the "addition of a label" at the position in which the drag a3 has been ended. Consequently, as indicated by a reference numeral a4, the label is added at the position in which the drag a3 has been ended.

Thus, after the context menu is displayed, the information processing apparatus 1 can change the position in which the menu item of the "addition of a label" selected from among the menu items included in the context menu is executed. Even if objects displayed on a screen are densely packed, the information processing apparatus 1 can improve the efficiency of the operation to display a context menu. Furthermore, even if a context menu is displayed when the objects displayed on the screen are densely packed, the information processing apparatus 1 can improve the visibility of the objects displayed on the screen.

Example of a Flowchart of the Menu Operation Process

Figure 3:
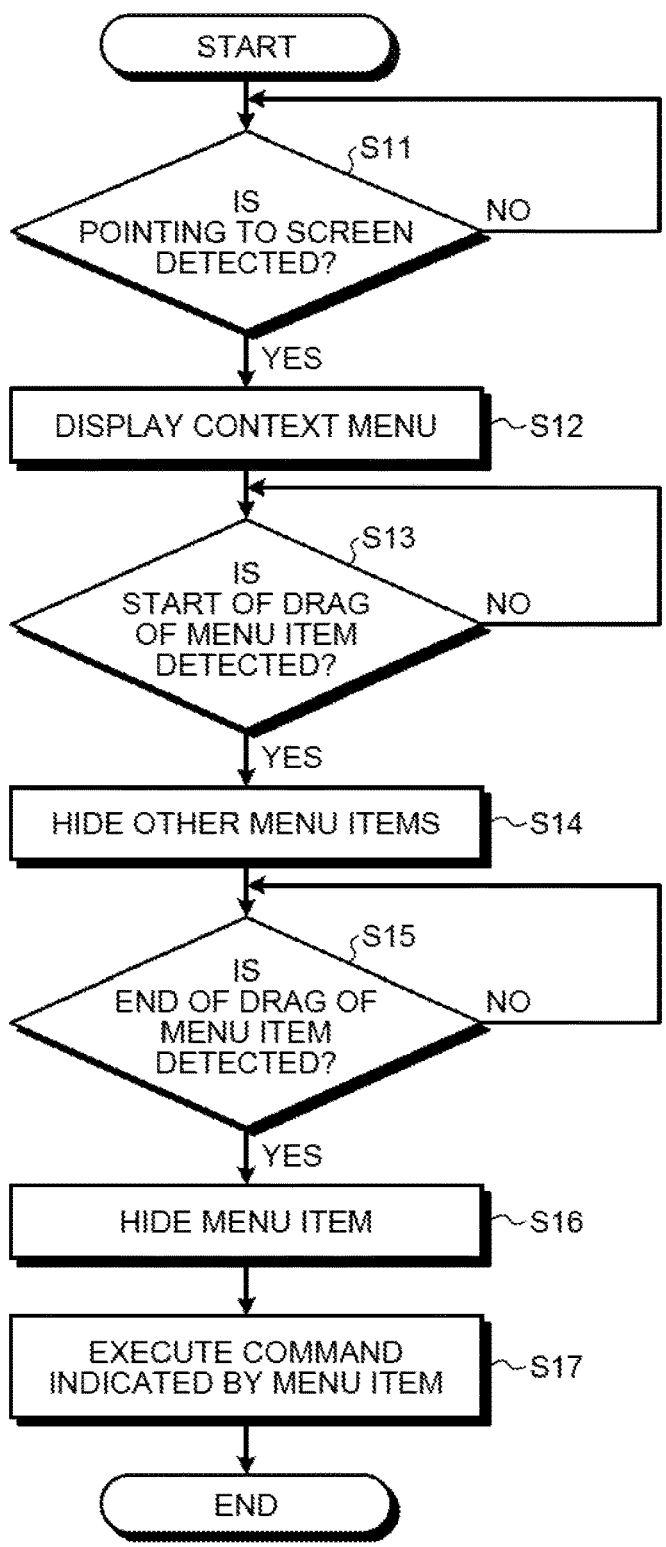
FIG. 3 is a flowchart illustrating an example of the flow of the menu operation process according to the first embodiment.

FIG. 3 is a flowchart illustrating an example of the flow of the menu operation process according to the first embodiment.

As illustrated in FIG. 3, the pointing operation acquisition unit 22 decides whether a pointing to a screen is detected (Step S11). If the pointing operation acquisition unit 22 decides that a pointing to a screen is not detected (No at Step S11), the pointing operation acquisition unit 22 repeats the decision process until the pointing operation acquisition unit 22 detects the pointing to the screen.

In contrast, if the pointing operation acquisition unit 22 decides that a pointing to a screen is detected (Yes at Step S11), the context menu display unit 23 displays the context menu near the detected position (Step S12).

Then, the menu item selection operation decision unit 24 detects whether an operation to start a drag of the menu item is detected (Step S13). If the menu item selection operation decision unit 24 decides that an operation to start a drag of the menu item is not detected (No at Step S13), the menu item selection operation decision unit 24 repeats the decision process until the menu item selection operation decision unit 24 detects the subject operation.

In contrast, if the menu item selection operation decision unit 24 decides that an operation to start a drag of the menu item is detected (Yes at Step S13), the menu item display unit 26 prevents the other menu items included in the context menu from being displayed (Step S14). Furthermore, the menu item display unit 26 changes, on the basis of the drag operation, the display position of the menu item that is targeted for the drag.

Then, the target selection operation decision unit 25 detects whether an operation to end the drag of the menu item is detected (Step S15). If the target selection operation decision unit 25 decides that an operation to end the drag of the menu item is not detected (No at Step S15), the target selection operation decision unit 25 repeats the decision process until the target selection operation decision unit 25 detects the subject operation.

In contrast, if the target selection operation decision unit 25 decides that an operation to end the drag of the menu item is detected (Yes at Step S15), the menu item display unit 26 prevents the subject menu item from being displayed (Step S16).

Then, on the basis of the position in which the drag has been ended, the command calculation unit 27 calculates the command indicated by the menu item (Step S17). Then, the menu operation process is ended.

In the first embodiment, a movement of a menu item in a context menu has been described as a drag operation. However, in the first embodiment, the movement is not limited to this and, instead of the drag operation, a movement of a menu item included in a context menu may also be a pointing operation. Therefore, a menu operation process performed when a movement of a menu item in a context menu is a pointing operation.

Another Example of the Menu Operation Process

Figure 4:
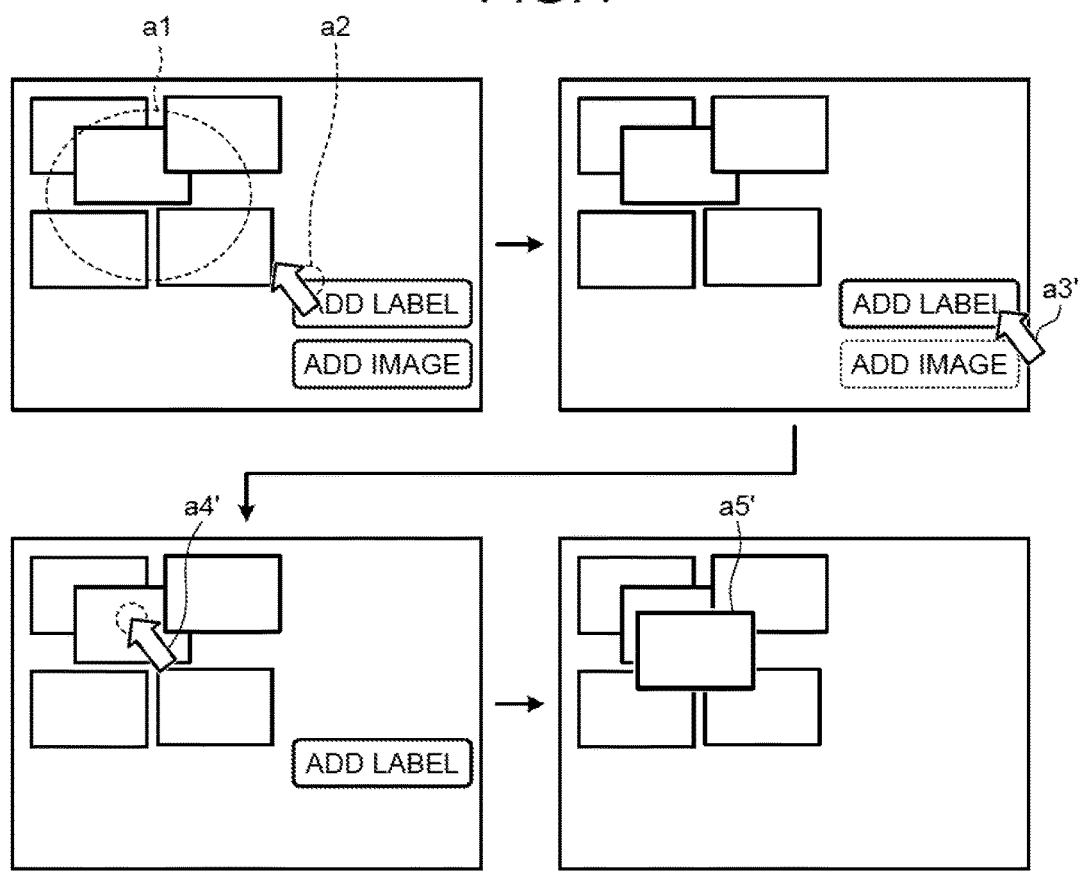
FIG. 4 is a schematic diagram illustrating another example of the menu operation process according to the first embodiment.

Another example of the menu operation process according to the first embodiment will be described with reference to FIG. 4. FIG. 4 is a schematic diagram illustrating another example of the menu operation process according to the first embodiment. In also FIG. 4, similarly to FIG. 2, it is assumed that the area indicated by the reference numeral a1 is an area in which the objects are densely packed.

In this state, it is assumed that a pointing is performed at the position that is indicated by the reference numeral a2 and that is easily tapped. Then, because no object is displayed on the pointing position, the pointing operation acquisition unit 22 sets the canvas on the screen to the target for the pointing. Then, when a pointing operation is acquired by the pointing operation acquisition unit 22, the context menu display unit 23 displays a context menu near the pointing position. Here, in the context menu, the menu items of the "addition of a label" and the "addition of an image" are included.

Then, it is assumed that, as indicated by a reference numeral a3', a pointing is performed on the menu item of the "addition of a label". Then, the menu item selection operation decision unit 24 detects the first operation that is used to select the menu item of the "addition of a label". Here, the first operation is an operation to perform a pointing on the menu item.

Then, it is assumed that, as indicated by a reference numeral a4', a pointing is performed on the menu item of the "addition of a label". Then, the target selection operation decision unit 25 detects the second operation that is used to select the position in which the command indicated by the menu item of the "addition of a label" is executed. Here, the second operation is an operation to perform a pointing the menu item.

Then, the command calculation unit 27 calculates the command indicated by the menu item of the "addition of a label" at the position in which the pointing a4' has been performed. Therefore, as indicated by a reference numeral a5', the label is added at the position in which the pointing a4' has been performed.

Consequently, after having displayed the context menu, the information processing apparatus 1 can change the position in which the menu item of the "addition of a label" selected from among the menu items included in the context menu is executed. Even if objects displayed on a screen are densely packed, the information processing apparatus 1 can improve the efficiency of the operation to display a context menu. Furthermore, even if a context menu is displayed when the objects displayed on the screen are densely packed, the information processing apparatus 1 can improve the visibility of the objects displayed on the screen.

Another Example of a Flowchart of the Menu Operation Process

Figure 5:
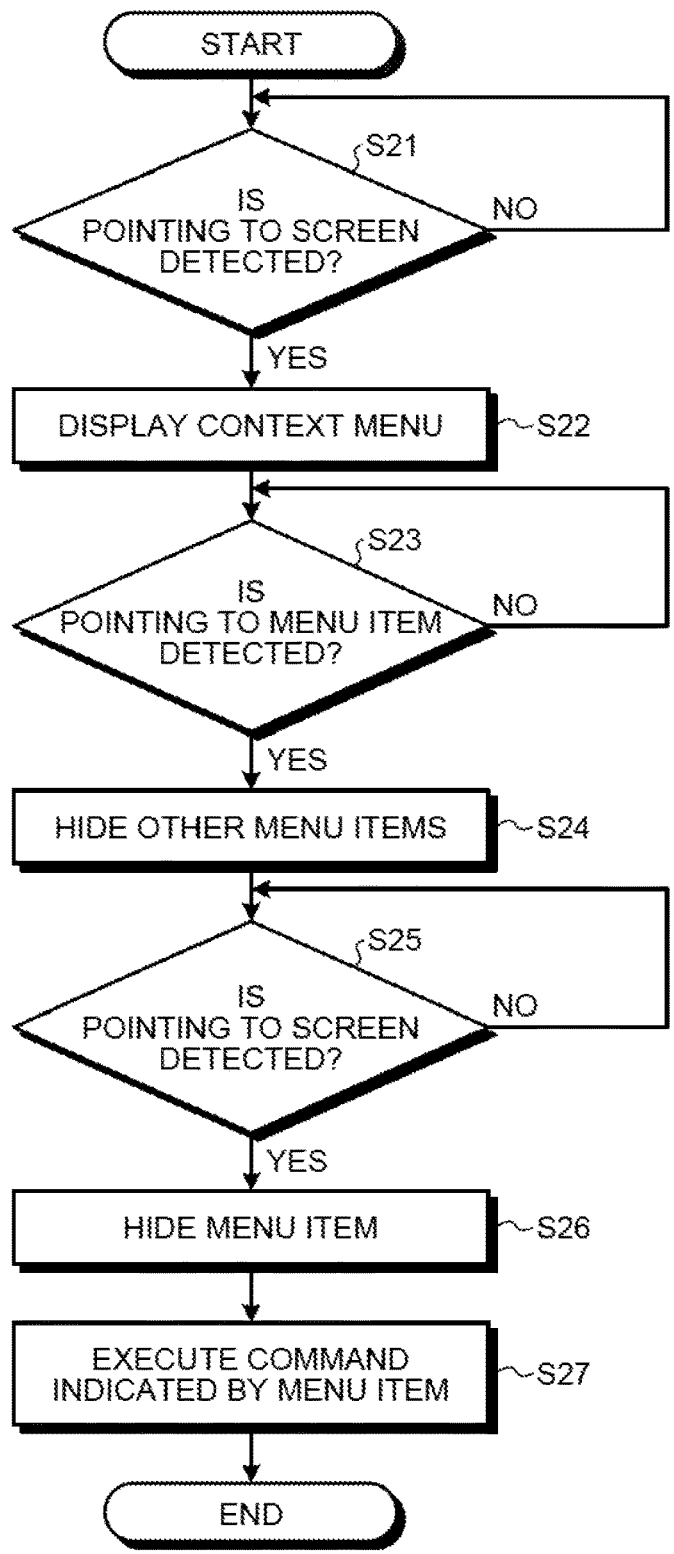
FIG. 5 is a flowchart illustrating another example of the flow of the menu operation process according to the first embodiment.

FIG. 5 is a flowchart illustrating another example of the flow of the menu operation process according to the first embodiment.

As illustrated in FIG. 5, the pointing operation acquisition unit 22 decides whether a pointing to a screen is detected (Step S21). If the pointing operation acquisition unit 22 decides that a pointing to a screen is not detected (No at Step S21), the pointing operation acquisition unit 22 repeats the decision process until the pointing operation acquisition unit 22 detects the pointing to the screen.

In contrast, if the pointing operation acquisition unit 22 decides that a pointing to a screen is detected (Yes at Step S21), the context menu display unit 23 displays the context menu near the detected position (Step S22).

Then, the menu item selection operation decision unit 24 detects whether a pointing to the menu item is detected (Step S23). If the menu item selection operation decision unit 24 decides that a pointing to the menu item is not detected (No at Step S23), the menu item selection operation decision unit 24 repeats the decision process until the menu item selection operation decision unit 24 detects the subject operation.

In contrast, if the menu item selection operation decision unit 24 decides that a pointing to the menu item is detected (Yes at Step S23), the menu item display unit 26 prevents the other menu items included in the context menu from being displayed (Step S24).

Then, the target selection operation decision unit 25 detects whether a pointing to a screen is detected (Step S25). If the target selection operation decision unit 25 decides that a pointing to a screen is not detected (No at Step S25), the target selection operation decision unit 25 repeats the decision process until the subject operation is detected.

In contrast, if the target selection operation decision unit 25 decides that a pointing to a screen is detected (Yes at Step S25), the menu item display unit 26 prevents the subject menu item from being displayed (Step S26).

Then, on the basis of the position in which the pointing is detected, the command calculation unit 27 calculates the command indicated by the menu item (Step S27). Then, the menu operation process is ended.

Effect of the First Embodiment

In this way, in the first embodiment described above, the information processing apparatus 1 selects a menu item included in a context menu and selects, regarding the selected menu item, an end position that is the result of a movement due to a predetermined operation. The information processing apparatus 1 displays the content indicated by the menu item at the selected end position. With this configuration, after having displayed the context menu, the information processing apparatus 1 can change the position in which the menu item from among the menu items included in the context menu. Furthermore, even if objects displayed on a screen are densely packed, the information processing apparatus 1 can improve the efficiency of the operation to display a context menu. Furthermore, even if a context menu is displayed when the objects displayed on the screen are densely packed, the information processing apparatus 1 can improve the visibility of the objects displayed on the screen.

[b] Second Embodiment

In the first embodiment, after having displayed a context menu, the information processing apparatus 1 displays the content indicated by the menu item at the end position that is the result of the movement due to a drag operation of the selected menu item. However, the information processing apparatus 1 is not limited to this and may also be used in a case in which, on the basis of a drag trajectory of the selected menu item, selection of the menu item is canceled.

Thus, in a second embodiment, a description will be given of a case in which the information processing apparatus 1 cancels the selection of the menu item on the basis of a drag trajectory of the selected menu item.

Figure 6:
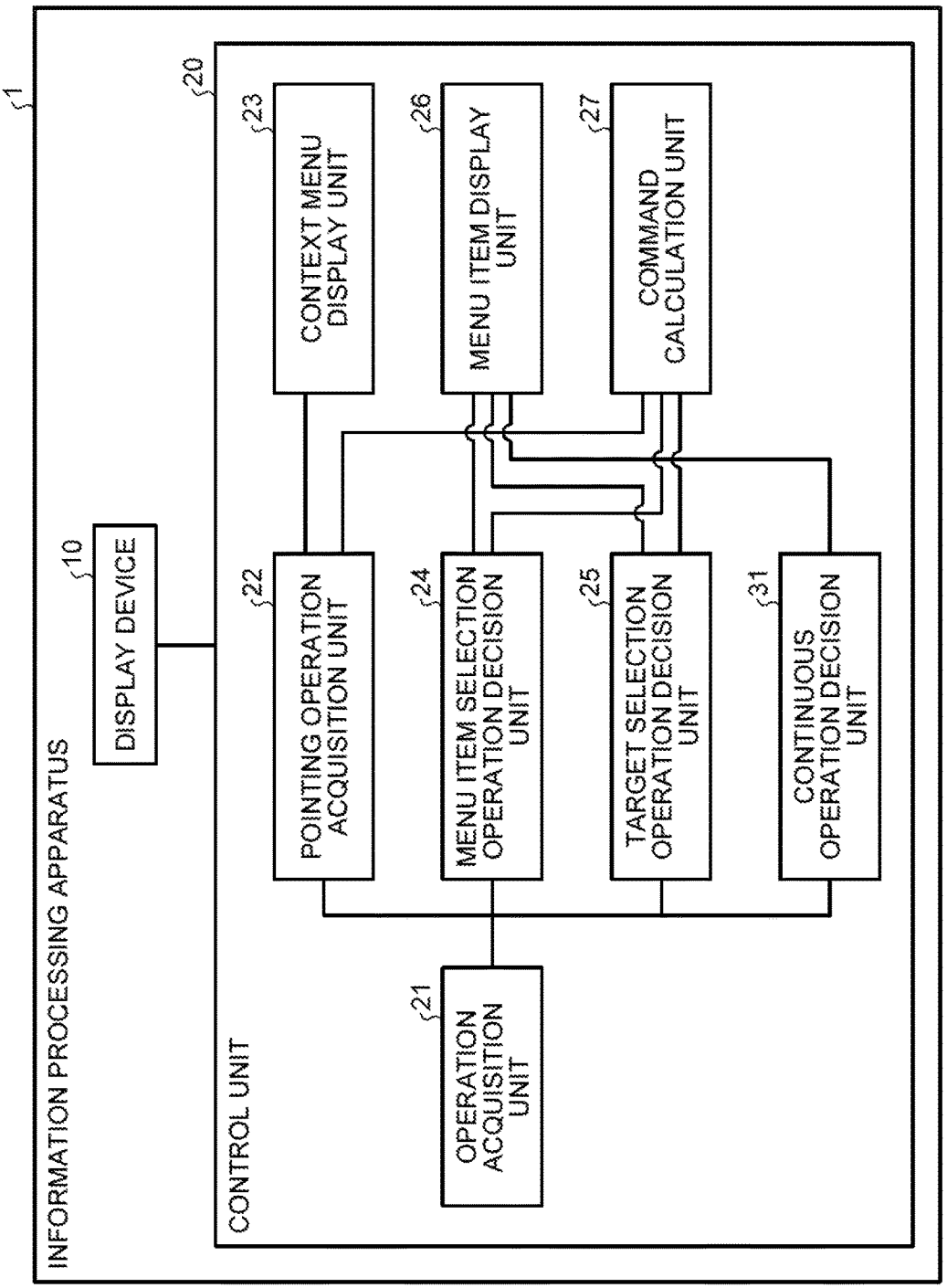
FIG. 6 is a functional block diagram illustrating the configuration of an information processing apparatus according to a second embodiment.

Configuration of an Information Processing Apparatus According to a Second Embodiment FIG. 6 is a functional block diagram illustrating the configuration of an information processing apparatus according to a second embodiment. The components having the same configuration as those in the information processing apparatus 1 illustrated in FIG. 1 are assigned the same reference numerals; therefore, overlapped descriptions of the configuration and the operation thereof will be omitted. The second embodiment is different from the first embodiment in that a continuous operation decision unit 31 is added.

The continuous operation decision unit 31 decides, on the basis of a movement trajectory of a menu item, whether to continue to select a menu item is.

As an example, if a movement trajectory in a menu item is a trajectory that returns to the vicinity of the starting position of the movement after a start of the movement, the continuous operation decision unit 31 decides not to continue to select the menu item. Namely, the continuous operation decision unit 31 decides to stop selecting a menu item. Namely, after a drag of a menu item is started and the menu item is moved from the context menu by a predetermined distance or more, if the menu item is dragged and moved such that the menu item returns to the vicinity of the starting position, the continuous operation decision unit 31 decides that an operation to stop selecting the menu item has been performed. The vicinity of the starting position is, for example, the distance between the starting position and the end position is within a predetermined threshold.

For another example, if a movement trajectory of the menu item is a trajectory that satisfies a predetermined condition after the start of the movement, the continuous operation decision unit 31 decides not to continue to select the menu item. Namely, the continuous operation decision unit 31 decides to stop selecting the menu item. The trajectory that satisfies a predetermined condition is, as an example, a trajectory indicating a scratch gesture. The scratch gesture is a gesture repeatedly traveling to and from a certain center line in a short time.

Example of a Menu Operation Process

Figure 7:
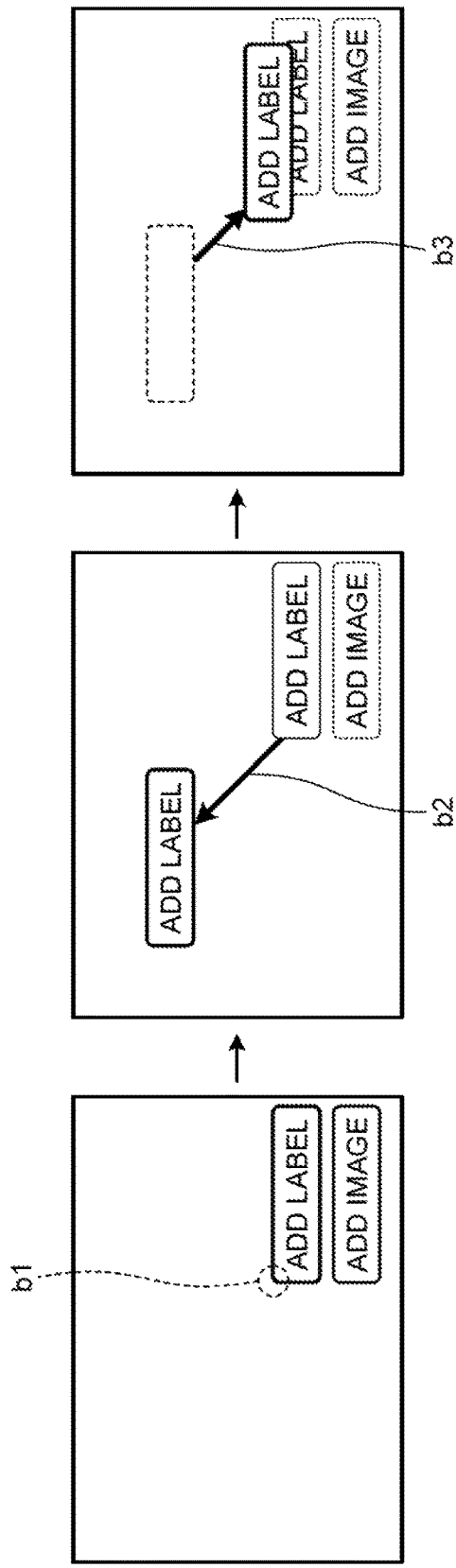
FIG. 7 is a schematic diagram illustrating an example of a menu operation process according to the second embodiment.

An example of a menu operation process according to the second embodiment will be described with reference to FIG. 7. FIG. 7 is a schematic diagram illustrating an example of a menu operation process according to the second embodiment.

It is assumed that a pointing is performed at the position indicated by the reference numeral b1. Because no object is displayed at the pointing position, the pointing operation acquisition unit 22 sets a canvas of a screen to the target for the pointing. Then, when a pointing operation is acquired by the pointing operation acquisition unit 22, the context menu display unit 23 displays the context menu near the pointing position. Here, in the context menu, the menu items of the "addition of a label" and the "addition of an image" are included.

Then, it is assumed that the menu item of the "addition of a label" is selected and then a drag b2 is started. Then, the menu item selection operation decision unit 24 detects the first operation that is used to select the menu item of the "addition of a label". Here, the first operation is an operation to start a drag. The menu item display unit 26 changes, on the basis of the drag operation, the display position of the menu item of the "addition of a label".

Then, it is assumed that, after the menu item is moved from the context menu by a predetermined distance or more, the operation indicated by the drag b3 is performed such that the menu item returns to the vicinity of the starting position. Then, the continuous operation decision unit 31 decides that an operation to stop selecting the menu item of the "addition of a label" is performed. Then, the menu item display unit 26 prevents the menu item of the "addition of a label" from being displayed.

Consequently, by using the drag trajectory of the menu item of the context menu, the information processing apparatus 1 can decide whether the drag operation is selection of a menu item or a stop of the selection of the menu item.

Example of a Flowchart of the Menu Operation Process

Figure 8:
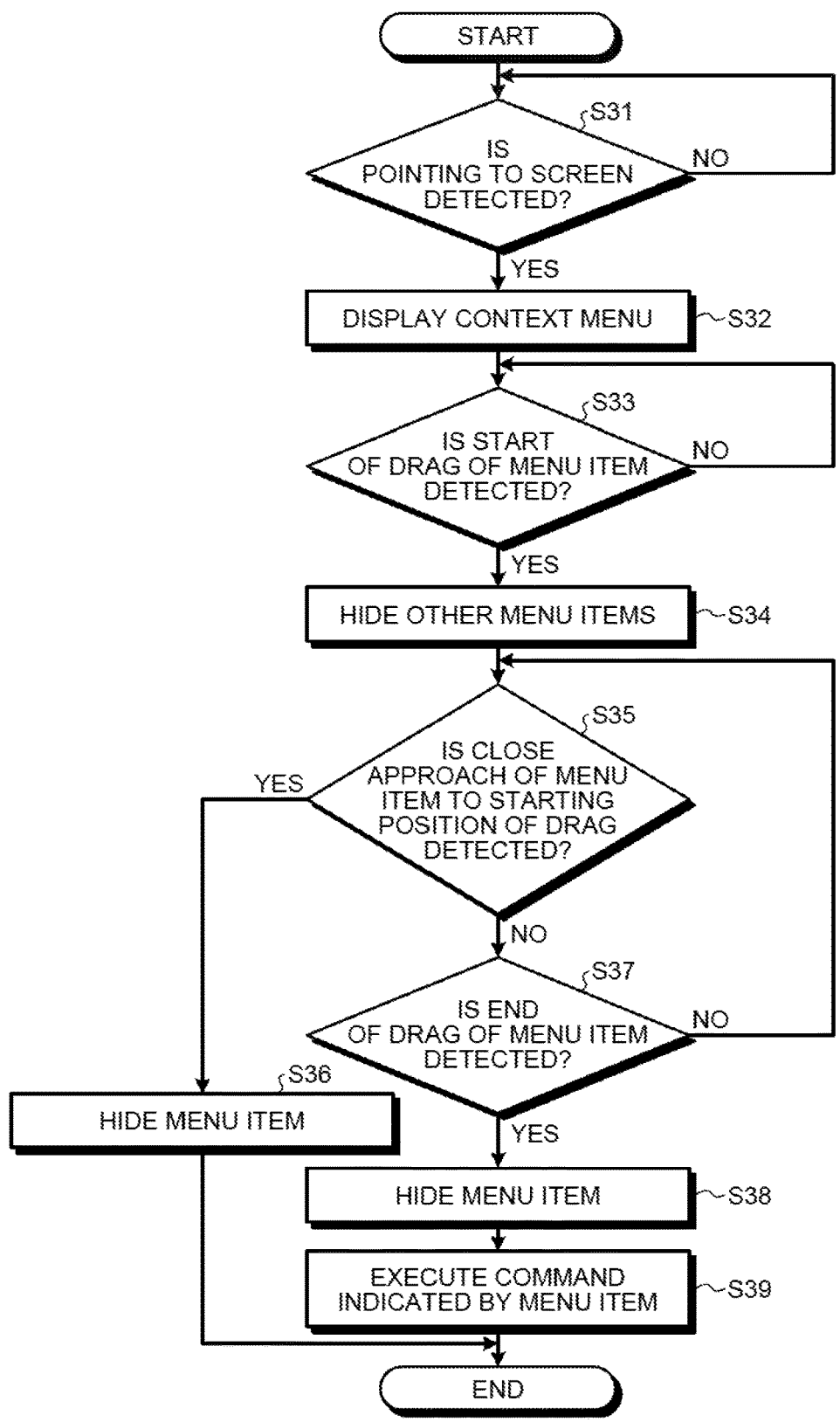
FIG. 8 is a flowchart illustrating an example of the flow of the menu operation process according to the second embodiment.

FIG. 8 is a flowchart illustrating an example of the flow of the menu operation process according to the second embodiment.

As illustrated in FIG. 8, the pointing operation acquisition unit 22 decides whether a pointing to a screen is detected (Step S31). If the pointing operation acquisition unit 22 decides that a pointing to a screen is not detected (No at Step S31), the pointing operation acquisition unit 22 repeats the decision process until the pointing operation acquisition unit 22 detects a pointing to the screen.

In contrast, if the pointing operation acquisition unit 22 decides that a pointing to a screen is detected (Yes at Step S31), the context menu display unit 23 displays a context menu near the detected position (Step S32).

Then, the menu item selection operation decision unit 24 detects whether an operation to start a drag of a menu item is detected (Step S33). If the menu item selection operation decision unit 24 decides that an operation to start a drag of a menu item is not detected (No at Step S33), the menu item selection operation decision unit 24 repeats the decision process until the menu item selection operation decision unit 24 detects the subject operation.

In contrast, if the menu item selection operation decision unit 24 decides that an operation to start a drag of a menu item is detected (Yes at Step S33), the menu item display unit 26 prevents the other menu items included in the context menu from being displayed (Step S34). Furthermore, the menu item display unit 26 changes, on the basis of the drag operation, the display position of the menu item targeted for the drag.

Then, the continuous operation decision unit 31 decides whether a close approach of the menu item to the starting position of the drag is detected (Step S35). A close approach to the starting position means the vicinity of the starting position and indicates that, for example, the distance between the starting position and the end position is within a predetermined threshold.

If the continuous operation decision unit 31 decides that a close approach of the menu item to the starting position of the drag is detected (Yes at Step S35), the menu item display unit 26 prevents the subject menu item from being displayed (Step S36). Then, the menu operation process is ended.

In contrast, if the continuous operation decision unit 31 decides that a close approach of the menu item to the starting position of the drag is not detected (No at Step S35), the target selection operation decision unit 25 detects whether an operation to end the drag of the menu item is detected (Step S37). If the target selection operation decision unit 25 decides that an operation to end the drag of the menu item is not detected (No at Step S37), the target selection operation decision unit 25 repeats the decision process until the target selection operation decision unit 25 detects the subject operation.

In contrast, if the target selection operation decision unit 25 decides that an operation to end the drag of the menu item is detected (Yes at Step S37), the menu item display unit 26 prevents the subject menu item from being displayed (Step S38).

Then, on the basis of the position in which the drag has been ended, the command calculation unit 27 calculates the command indicated by the menu item (Step S39). Then, the menu operation process is ended.

Another Example of the Menu Operation Process

Figure 9:
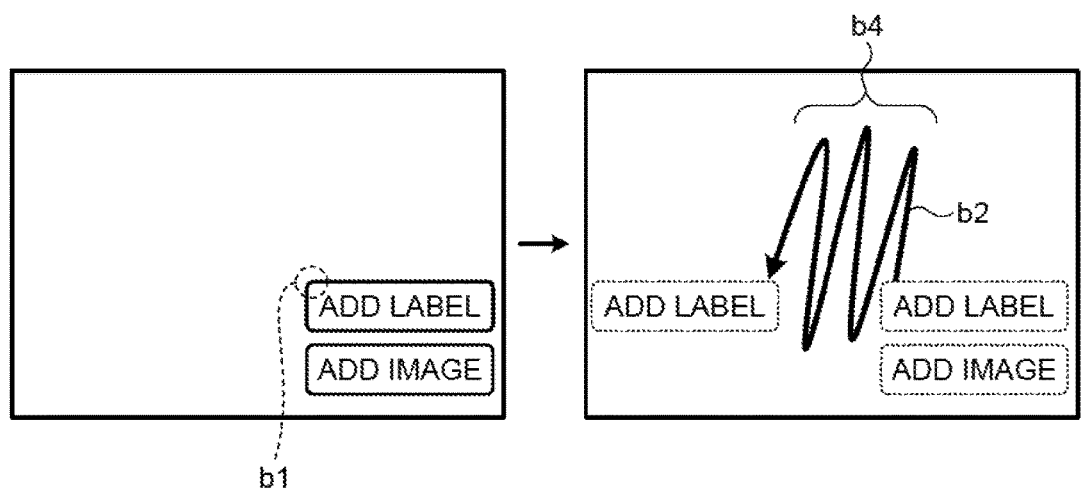
FIG. 9 is a schematic diagram illustrating another example of the menu operation process according to the second embodiment.

Another example of the menu operation process according to the second embodiment will be described with reference to FIG. 9. FIG. 9 is a schematic diagram illustrating another example of the menu operation process according to the second embodiment.

It is assumed that a pointing is performed at the position indicated by the reference numeral b1. Then, because no object is displayed at the pointing position, the pointing operation acquisition unit 22 sets a canvas of a screen to the target for the pointing. Then, when a pointing operation is acquired by the pointing operation acquisition unit 22, the context menu display unit 23 displays a context menu near the pointing position. Here, in the context menu, the menu items of the "addition of a label" and the "addition of an image" are included.

Then, it is assumed that the menu item of the "addition of a label" is selected and the drag b2 is started. Then, the menu item selection operation decision unit 24 detects the first operation that is used to select the menu item of the "addition of a label". Here, the first operation is an operation to start a drag. The menu item display unit 26 changes, on the basis of the drag operation, the display position of the menu item of the "addition of a label".

Then, it is assumed that a trajectory of the drag operation of the menu item is a scratch gesture b4. Then, the continuous operation decision unit 31 decides that an operation to stop selecting the menu item of the "addition of a label" has been performed. Then, the menu item display unit 26 prevents the menu item of the "addition of a label" from being displayed.

Consequently, by using the drag trajectory of the menu item included in the context menu, the information processing apparatus 1 can decide whether the drag operation is selection of a menu item or a stop of selection of the menu item.

Another Example of a Flowchart of the Menu Operation Process

Figure 10:
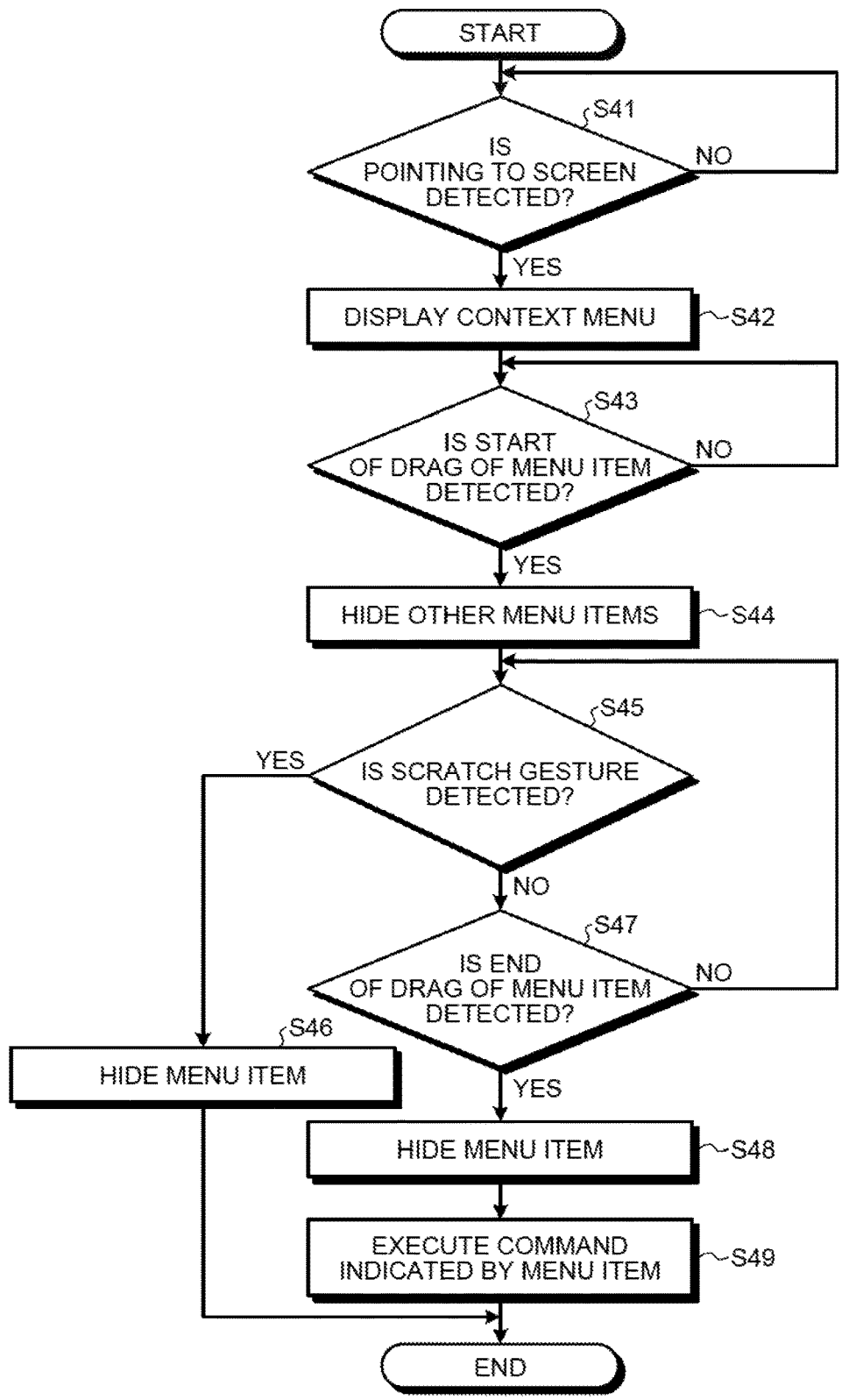
FIG. 10 is a flowchart illustrating another example of the flow of the menu operation process according to the second embodiment.

FIG. 10 is a flowchart illustrating another example of the flow of the menu operation process according to the second embodiment.

As illustrated in FIG. 10, the pointing operation acquisition unit 22 decides whether a pointing to a screen is detected (Step S41). If the pointing operation acquisition unit 22 decides that a pointing to a screen is not detected (No at Step S41), the pointing operation acquisition unit 22 repeats the decision process until the pointing operation acquisition unit 22 detects a pointing to the screen.

In contrast, if the pointing operation acquisition unit 22 decides that a pointing to a screen is detected (Yes at Step S41), the context menu display unit 23 displays a context menu near the detected position (Step S42).

Then, the menu item selection operation decision unit 24 detects whether an operation to start a drag of the menu item is detected (Step S43). If the menu item selection operation decision unit 24 decides that an operation to start a drag of the menu item is not detected (No at Step S43), the menu item selection operation decision unit 24 repeats the decision process until the menu item selection operation decision unit 24 detects the subject operation.

In contrast, if the menu item selection operation decision unit 24 decides that an operation to start a drag of the menu item is detected (Yes at Step S43), the menu item display unit 26 prevents the other menu items included in the context menu from being displayed (Step S44). Furthermore, the menu item display unit 26 changes, on the basis of the drag operation, the display position of the menu item targeted for the drag.

Then, the continuous operation decision unit 31 decides whether a scratch gesture is detected (Step S45). Namely, the continuous operation decision unit 31 decides whether the trajectory of the drag operation of the menu item is a trajectory that indicates a scratch gesture after the start of the drag. If the continuous operation decision unit 31 decides that a scratch gesture is detected (Yes at Step S45), the menu item display unit 26 prevents the menu item targeted for the drag from being displayed (Step S46). Then, the menu operation process is ended.

In contrast, if the continuous operation decision unit 31 decides that a scratch gesture is not detected (No at Step S45), the target selection operation decision unit 25 detects whether an operation to end the drag of the menu item is detected (Step S47). If the target selection operation decision unit 25 decides that an operation to end the drag of the menu item is not detected (No at Step S47), the target selection operation decision unit 25 repeats the decision process until the target selection operation decision unit 25 detects the subject operation.

In contrast, if the target selection operation decision unit 25 decides that an operation to end the drag of the menu item is detected (Yes at Step S47), the menu item display unit 26 prevents the subject menu item from being displayed (Step S48).

Then, on the basis of the end position of the drag, the command calculation unit 27 calculates the command indicated by the menu item (Step S49). Then, the menu operation process is ended.

Effect of the Second Embodiment

In this way, in the second embodiment described above, the information processing apparatus 1 decides, on the basis of the movement trajectory of the menu item selected in the context menu, whether to continue to select the menu item. With this configuration, by using the movement trajectory of the menu item in the context menu, the information processing apparatus 1 can decide whether a move operation moves the menu item, continues the operation of the menu item, or stops the operation of the menu item.

Furthermore, in the second embodiment described above, the information processing apparatus 1 decides whether the movement trajectory of the menu item is the trajectory that returns to the vicinity of the starting position of the movement after the movement is started. If the information processing apparatus 1 decides the movement trajectory of the menu item is the trajectory that returns to the vicinity of the starting position of the movement after the movement is started, the information processing apparatus 1 stops selecting the menu item. With this configuration, by using the movement trajectory of the menu item in the context menu, the information processing apparatus 1 can decide whether the move operation moves the menu item or stops the operation of the menu item.

Furthermore, in the second embodiment described above, the information processing apparatus 1 decides whether the movement trajectory of the menu item is the trajectory that indicates the scratch gesture after the movement is started. If the information processing apparatus 1 decides that the movement trajectory of the menu item is the trajectory that indicates a scratch gesture after the movement is started, the information processing apparatus 1 stops selecting the menu item. With this configuration, by using the movement trajectory of the menu item in the context menu, the information processing apparatus 1 can easily decide the movement operation is a stop of the operation of the menu item.

[c] Third Embodiment

In the first embodiment, after the information processing apparatus 1 displays a context menu, the information processing apparatus 1 displays the content indicated by the menu item at the end position that is the result of the movement due to the drag operation of the selected menu item. In the second embodiment, the information processing apparatus 1 cancels the selection of the menu item on the basis of the drag trajectory of the selected menu item. However, the information processing apparatus 1 is not limited to these but may also further continuously operate the menu item on the basis of the drag trajectory of the selected menu item.

Thus, in the third embodiment, a description will be given of a case in which the information processing apparatus 1 further continuously operates the menu item on the basis of the drag trajectory of the selected menu item.

Figure 11:
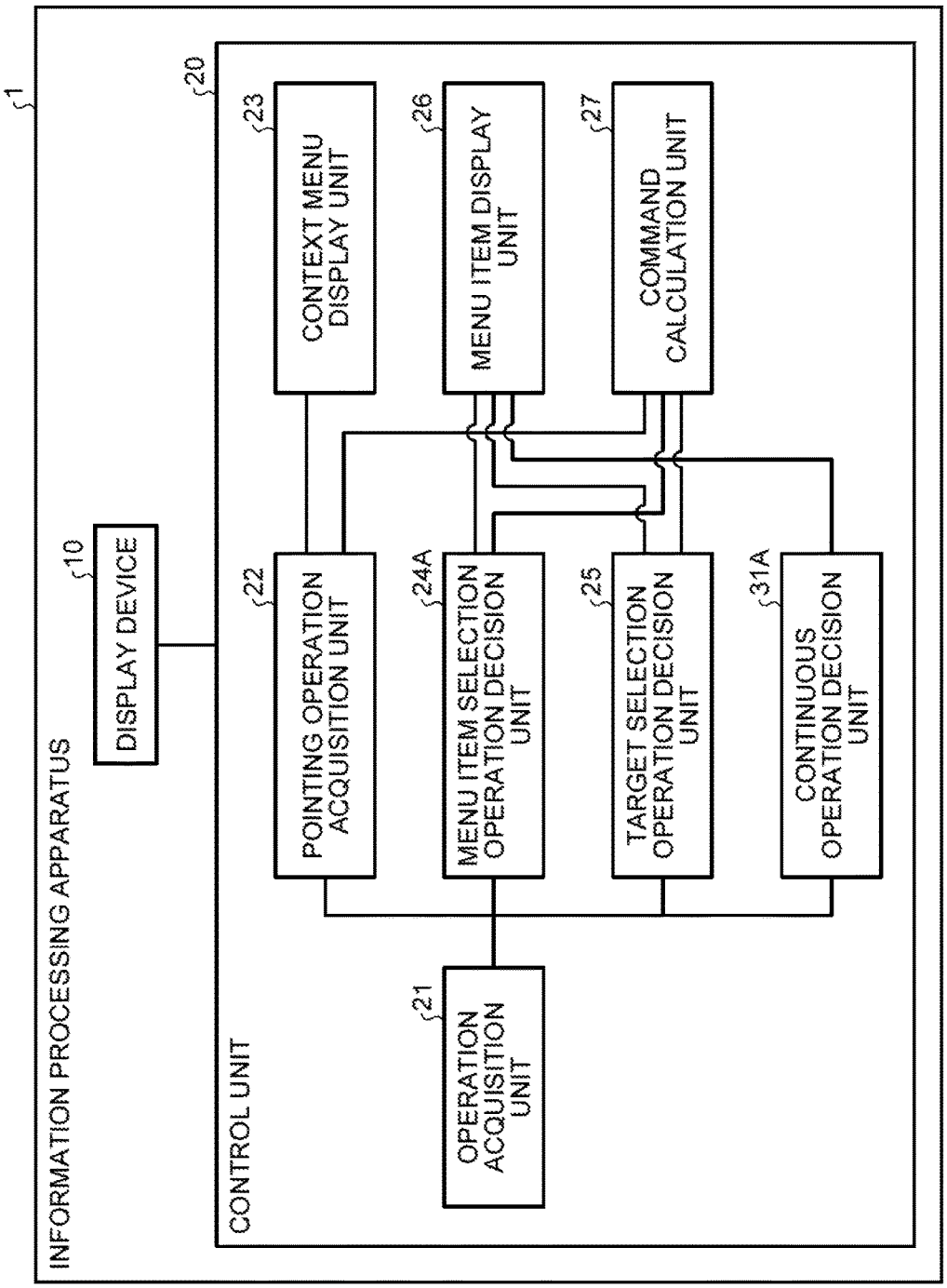
FIG. 11 is a functional block diagram illustrating the configuration of an information processing apparatus according to a third embodiment.

Configuration of an Information Processing Apparatus According to a Third Embodiment FIG. 11 is a functional block diagram illustrating the configuration of an information processing apparatus according to a third embodiment. The components having the same configuration as those in the information processing apparatus 1 illustrated in FIG. 6 are assigned the same reference numerals; therefore, overlapped descriptions of the configuration and the operation thereof will be omitted. The third embodiment is different from the second embodiment in that the menu item selection operation decision unit 24 is changed to a menu item selection operation decision unit 24A. Furthermore, the third embodiment is different from the second embodiment in that the continuous operation decision unit 31 is changed to a continuous operation decision unit 31A.

The menu item selection operation decision unit 24A detects the first operation that is used to select a menu item in the context menu. The first operation is, for example, an operation to start a drag. For example, if the same menu item in the context menu is touched several times, the menu item selection operation decision unit 24A decides that the first operation has been performed. The touch mentioned here means a "touchdown".

The continuous operation decision unit 31A decides, on the basis of a movement trajectory of the menu item, whether to continue to select the menu item.

As an example, if the continuous operation decision unit 31A decides that the first operation has been performed due to the same menu item being touched several times, the continuous operation decision unit 31A decides whether an amount of movement of the movement trajectory of the menu item indicated by a second touch and the subsequent touches is zero. If an amount of movement of the movement trajectory of the menu item indicated by the second touch and the subsequent touches is zero, the continuous operation decision unit 31A decides to continue to select the menu item is. For example, it is assumed that the first operation has been performed on a certain menu item indicated by the first touch and the second touch. Then, even if the menu item is dragged due to the first touch, if the touch position of the second touch is not moved, i.e., if an amount of movement is zero, the continuous operation decision unit 31A decides that the operation to select a menu item is continued.

As another example, the continuous operation decision unit 31A decides whether a predetermined time has elapsed for a time period from the end of the first movement trajectory of the menu item to the start of the second movement trajectory of the subject menu item. If the predetermined time has not elapsed for a time period from the end of the first movement trajectory of the menu item to the start of the second movement trajectory of the subject menu item, the continuous operation decision unit 31A decides that the operation to select a menu item is continued.

Example of a Menu Operation Process

Figure 12:
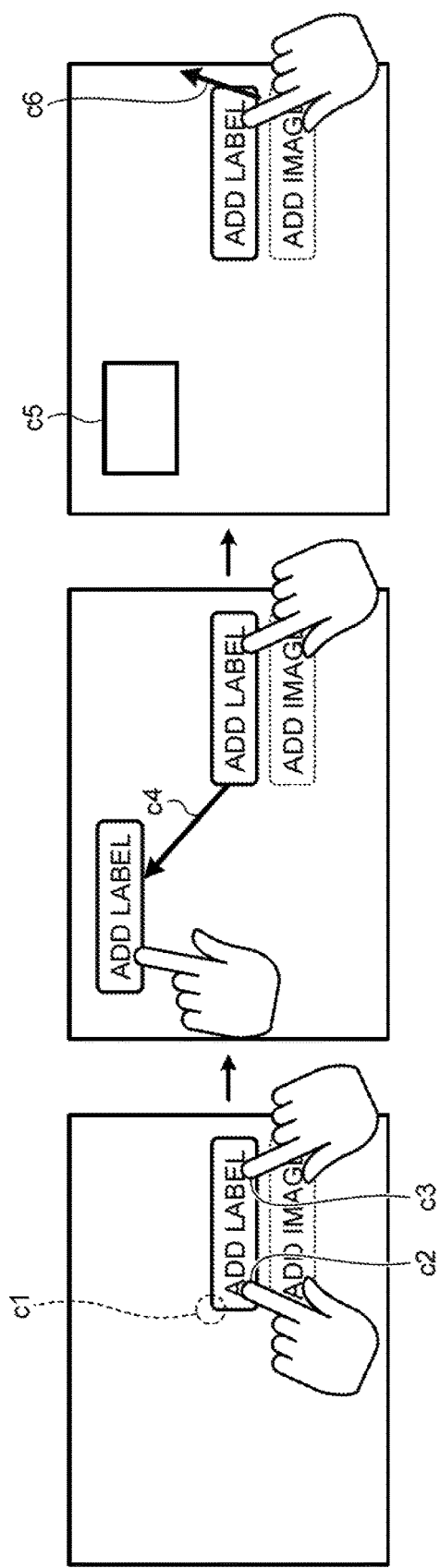
FIG. 12 is a schematic diagram illustrating an example of a menu operation process according to a third embodiment.

An example of a menu operation process according to the third embodiment will be described with reference to FIG. 12. FIG. 12 is a schematic diagram illustrating an example of a menu operation process according to a third embodiment.

It is assumed that pointing is performed at the position indicated by a reference numeral c1. Then, because no object is displayed on the pointing position, the pointing operation acquisition unit 22 sets a canvas of the screen to the target for the pointing. Then, when the pointing operation is acquired by the pointing operation acquisition unit 22, the context menu display unit 23 displays a context menu near the pointing position. Here, in the context menu, the menu items of the "addition of a label" and the "addition of an image" are included.

Then, it is assumed that the menu item of the "addition of a label" is selected by the first touch c2 and the second touch c3. Then, the menu item selection operation decision unit 24A decides that the first operation has been performed. Here, the first operation is an operation to start a drag.

Then, it is assumed that a drag c4 of the menu item of the "addition of a label" is started from the first touch c2. Furthermore, the touch position of the second touch c3 does not move. Then, the menu item display unit 26 changes the display position of the menu item of the "addition of a label" on the basis of the drag operation.

Then, the drag c4 of the menu item of the "addition of a label" is ended. Then, the target selection operation decision unit 25 detects the second operation that is used to select the position at which the command indicated by the menu item of the "addition of a label" is executed. Here, the second operation is an operation to end the drag.

Then, the command calculation unit 27 calculates the command indicated by the menu item of the "addition of a label" at the position in which the drag c4 has been ended. Here, the command calculation unit 27 calculates the command to perform the "addition of a label" at the position in which the drag c4 has been ended. Consequently, as indicated by a reference numeral c5, the label is added to the position in which the drag c4 has been ended.

Subsequently, the continuous operation decision unit 31A decides whether an amount of movement of the movement trajectory of the menu item of the "addition of a label" due to the second touch c3 is zero. If an amount of movement of the movement trajectory of the menu item of the "addition of a label" due to the second touch c3 is zero, the continuous operation decision unit 31A decides that the operation to select the menu item is continued. Here, because the touch position of the second touch c3 does not move, the continuous operation decision unit 31A decides that the operation to select the menu item of the "addition of a label" is continued.

Then, if a drag c6 of the menu item of the "addition of a label" is started from the second touch c3, the user can continuously operate the menu item of the "addition of a label". Namely, the menu item display unit 26 changes, on the basis of the drag operation, the display position of the menu item of the "addition of a label". If the drag c6 of the menu item of the "addition of a label" has been ended, the command calculation unit 27 calculates the command indicated by the menu item of the "addition of a label" at the position in which the drag c6 has been ended and then the label is added.

Consequently, the information processing apparatus 1 can continuously operate the menu item of the context menu.

Example of a Flowchart of a Menu Operation Process

Figure 13:
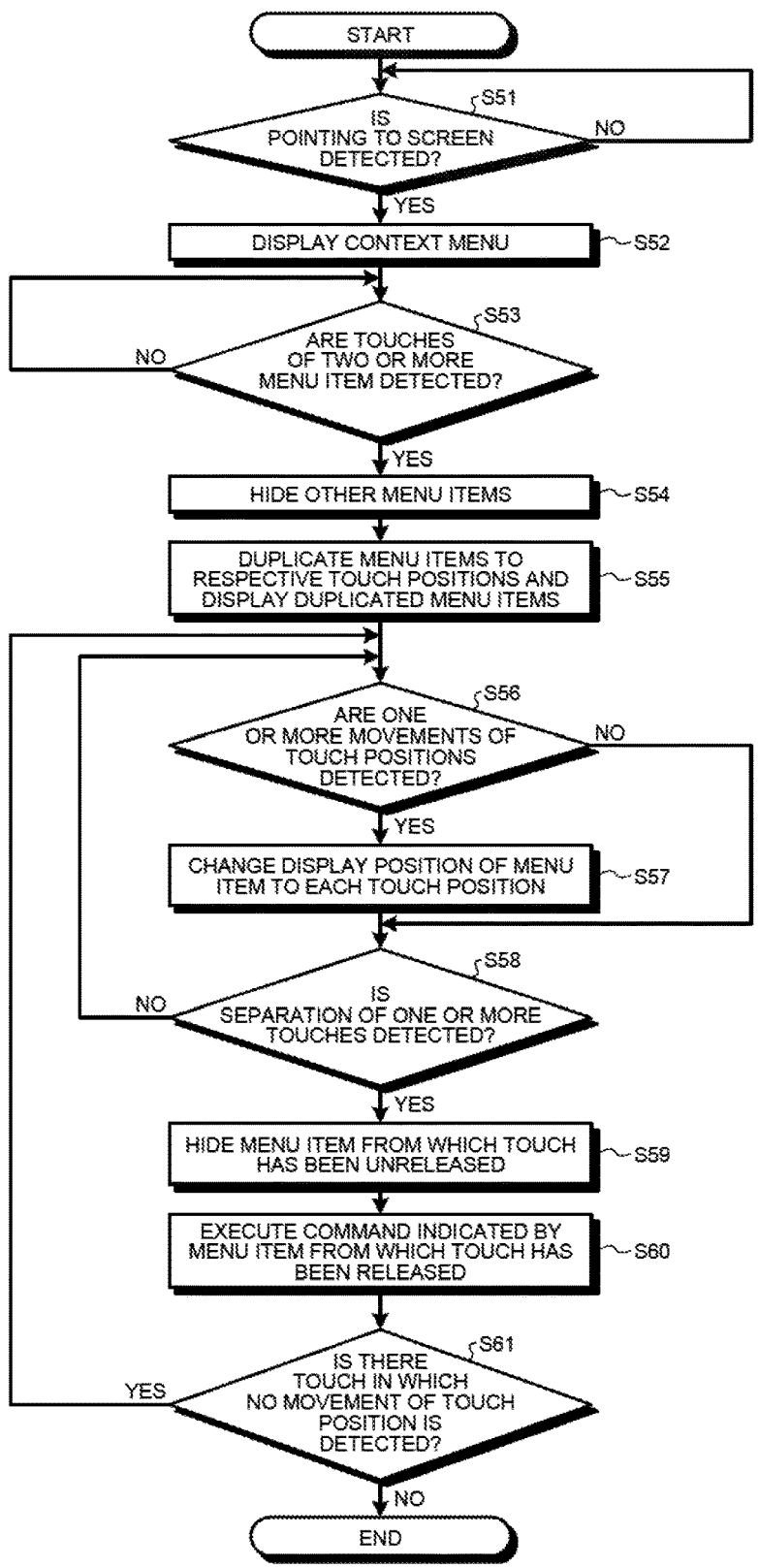
FIG. 13 is a flowchart illustrating an example of the flow of the menu operation process according to the third embodiment.

FIG. 13 is a flowchart illustrating an example of the flow of the menu operation process according to the third embodiment.

As illustrated in FIG. 13, the pointing operation acquisition unit 22 decides whether a pointing to the screen is detected (Step S51). If the pointing operation acquisition unit 22 decides that a pointing to the screen is not detected (No at Step S51), the pointing operation acquisition unit 22 repeats the decision process until the pointing operation acquisition unit 22 detects a pointing to the screen.

In contrast, if the pointing operation acquisition unit 22 decides that a pointing to the screen is detected (Yes at Step S51), the context menu display unit 23 displays the context menu near the detected position (Step S52).

Then, the menu item selection operation decision unit 24A decides whether two or more touches of the menu items are detected (Step S53). If the menu item selection operation decision unit 24A decides that two or more touches of the menu item are not detected (No at Step S53), the menu item selection operation decision unit 24A repeats the decision process until the subject operation is detected.

In contrast, if the menu item selection operation decision unit 24A decides that two or more touches of the menu items are detected (Yes at Step S53), the menu item display unit 26 prevents the other menu items included in the context menu from being displayed (Step S54). Then, the menu item display unit 26 duplicates the detected touched menu items to the respective touch positions and displays each of the duplicated menu items (Step S55).

The menu item display unit 26 decides whether one or more movements of the touch positions are detected (Step S56). If the menu item display unit 26 decides that no movement of the touch position is detected (No at Step S56), the menu item display unit 26 proceeds to Step S58.

In contrast, if the menu item display unit 26 decides that one or more movements of the touch positions are detected (Yes at Step S56), the menu item display unit 26 changes the display position of the menu item to each of the touch positions (Step S57). Then, the menu item display unit 26 proceeds to Step S58.

At Step S58, the target selection operation decision unit 25 decides whether release of one or more touches is detected (Step S58). If the target selection operation decision unit 25 decides that no release of the touches is detected (No at Step S58), the menu item display unit 26 proceeds to Step S56 in order to detect a movement of the touch position.

In contrast, if the target selection operation decision unit 25 decides that one or more releases of the touches are detected (Yes at Step S58), the menu item display unit 26 prevents the menu item from which the touch has been released from being displayed (Step S59). Then, on the basis of the position in which the touch has been released, the command calculation unit 27 executes the command that is indicated by the menu item from which the touch has been released (Step S60).

Then, the continuous operation decision unit 31A decides whether there is a touch in which no movement of the touch position is detected (Step S61). For example, the continuous operation decision unit 31A decides whether an amount of movement of the movement trajectory of the menu item due to the touch in which no movement of the touch position is detected is zero. If the continuous operation decision unit 31A decides that there is a touch in which no movement of the touch position is detected (Yes at Step S61), the continuous operation decision unit 31A proceeds to Step S56 in order to detect a movement of a touch position. This is because the continuous operation decision unit 31A decides that the operation is a continuous operation of the menu item.

In contrast, if the continuous operation decision unit 31A decides that there is no touch in which no movement of the touch position is detected (No at Step S61), the menu operation process is ended.

Another Example of the Menu Operation Process

Figure 14:
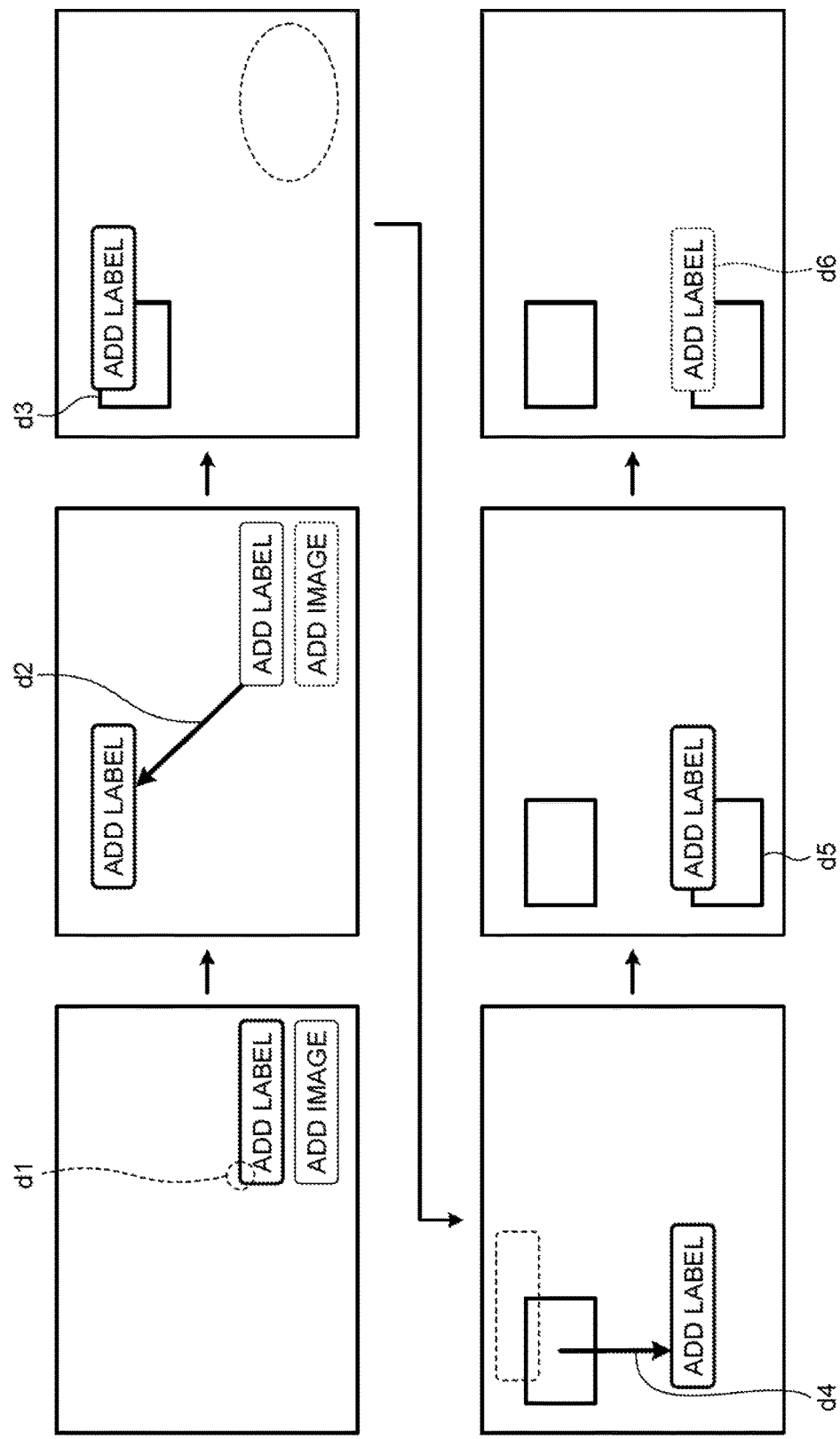
FIG. 14 is a schematic diagram illustrating another example of the menu operation process according to the third embodiment.

Another example of the menu operation process according to the third embodiment will be described with reference to FIG. 14. FIG. 14 is a schematic diagram illustrating another example of the menu operation process according to the third embodiment.

It is assumed that a pointing is performed at the position indicated by a reference numeral d1. Then, because no object is displayed on the pointing position, the pointing operation acquisition unit 22 sets the canvas of the screen to the target for the pointing. Then, when a pointing operation is acquired by the pointing operation acquisition unit 22, the context menu display unit 23 displays the context menu near the pointing position. Here, in the context menu, the menu items of the "addition of a label" and the "addition of an image" are included.

Then, it is assumed that the menu item of the "addition of a label" is selected and a drag d2 is started. Then, the menu item selection operation decision unit 24A detects the first operation that is used to select the menu item of the "addition of a label". Here, the first operation is an operation to start a drag. The menu item display unit 26 changes, on the basis of the drag operation, the display position of the menu item of the "addition of a label".

Then, it is assumed that the drag d2 of the menu item of the "addition of a label" has been ended. Then, the target selection operation decision unit 25 detects the second operation that is used to select the position in which the command indicated by the menu item of the "addition of a label" is performed. Here, the second operation is an operation to end the drag. The command calculation unit 27 calculates the command indicated by the menu item of the "addition of a label" at the position in which the drag d2 has been ended. Here, the command calculation unit 27 calculates the command to perform the "addition of a label" at the position in which the drag d2 has been ended. Consequently, as indicated by a reference numeral d3, the label is added to the position in which the drag d2 has been ended.

Then, the continuous operation decision unit 31A decides whether a predetermined time has elapsed for a time period from the end of the movement trajectory of the menu item of the "addition of a label" to the start of the subsequent movement trajectory of the menu item of the same "addition of a label". Here, it is assumed that the continuous operation decision unit 31A decides that a predetermined time has not elapsed for a time period from the end of the movement trajectory of the menu item of the "addition of a label" to the start of the subsequent movement trajectory of the menu item of the same "addition of a label". At this point, it is assumed that the menu item selection operation decision unit 24A detects the first operation that is used to select the menu item of the "addition of a label". Then, the menu item display unit 26 changes, on the basis of the drag operation d4, the display position of the menu item of the "addition of a label".

Then, it is assumed that a drag d4 of the menu item of the "addition of a label" has been ended. Then, the target selection operation decision unit 25 detects the second operation that is used to select the position in which the command indicated by the menu item of the "addition of a label" is executed. The command calculation unit 27 calculates the command indicated by the menu item of the "addition of a label" at the position in which the drag d4 has been ended. At this point, the command calculation unit 27 calculates the command to perform the "addition of a label" at the position in which the drag d4 has been ended. Consequently, as indicated by the reference numeral d5, the label is added at the position in which the drag d4 has been ended.

Then, if a predetermined time has elapsed for a time period from the end of the movement trajectory of the menu item of the "addition of a label" to the start of the subsequent movement trajectory of the menu item of the same "addition of a label", as indicated by a reference numeral d6, the continuous operation decision unit 31A prevents the menu item of the "addition of a label" from being displayed.

Consequently, the information processing apparatus 1 can continuously operate the menu item included in the context menu.

Another Example of the Flowchart of the Menu Operation Process

Figure 15:
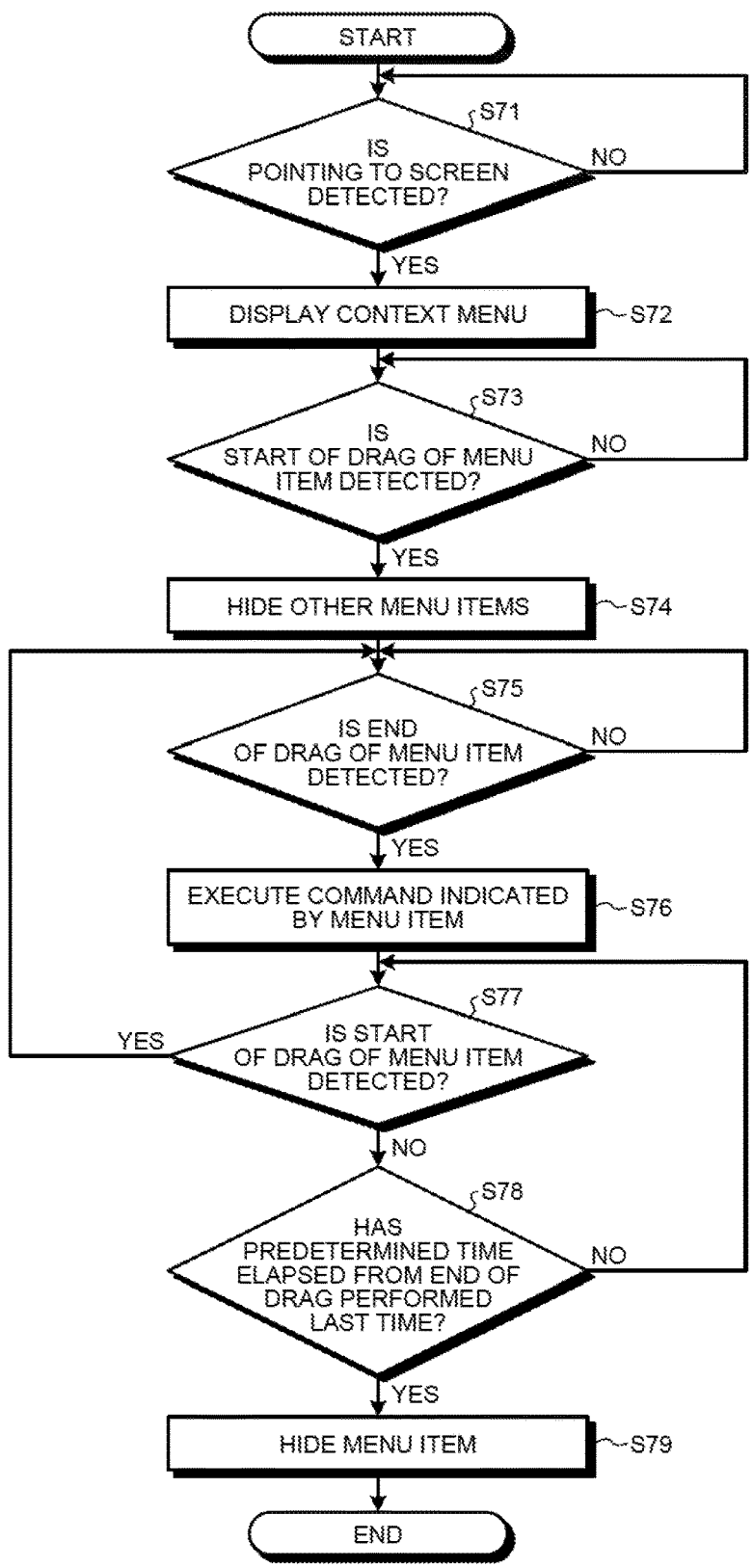
FIG. 15 is a flowchart illustrating another example of the flow of the menu operation process according to the third embodiment.

FIG. 15 is a flowchart illustrating another example of the flow of the menu operation process according to the third embodiment.

As illustrated in FIG. 15, the pointing operation acquisition unit 22 decides whether a pointing to the screen is detected (Step S71). If the pointing operation acquisition unit 22 decides that a pointing to the screen is not detected (No at Step S71), the pointing operation acquisition unit 22 repeats the decision process until a pointing to the screen is detected.

In contrast, if the pointing operation acquisition unit 22 decides that a pointing to the screen is detected (Yes at Step S71), the context menu display unit 23 displays the context menu near the detected position (Step S72).

Subsequently, the menu item selection operation decision unit 24A detects whether an operation to start a drag of the menu item is detected (Step S73). If the menu item selection operation decision unit 24A decides that an operation to start a drag of the menu item is not detected (No at Step S73), the menu item selection operation decision unit 24A repeats the decision process until the subject operation is detected.

In contrast, if the menu item selection operation decision unit 24A decides that an operation to start a drag of the menu item is detected (Yes at Step S73), the menu item display unit 26 prevents the other menu items included in the context menu from being displayed (Step S74). Furthermore, the menu item display unit 26 changes, on the basis of the drag operation, the display position of the menu item targeted for the drag.

Then, the target selection operation decision unit 25 detects whether an operation to end the drag of the menu item is detected (Step S75). If the target selection operation decision unit 25 decides that an operation to end the drag of the menu item is not detected (No at Step S75), the target selection operation decision unit 25 repeats the decision process until the target selection operation decision unit 25 detects the subject operation.

In contrast, if the target selection operation decision unit 25 decides that an operation to end the drag of the menu item is detected (Yes at Step S75), the command calculation unit 27 executes, on the basis of the position in which the drag has been ended, the command indicated by the menu item (Step S76).

Then, the menu item selection operation decision unit 24A detects whether an operation to start a drag of the menu item is detected (Step S77). If the menu item selection operation decision unit 24A decides that an operation to start a drag of the menu item is detected (Yes at Step S77), the target selection operation decision unit 25 proceeds to Step S75 in order to detect the end of the drag of the menu item.

In contrast, if the menu item selection operation decision unit 24A decides that an operation to start a drag of the menu item is not detected (No at Step S77), the continuous operation decision unit 31A decides whether a predetermined time has elapsed from the end of the drag performed last time (Step S78). If the continuous operation decision unit 31A decides that a predetermined time has not elapsed from the end of the drag performed last time (No at Step S78), the menu item selection operation decision unit 24A proceeds to Step S77 in order to detect the start of the drag of the menu item.

In contrast, if the continuous operation decision unit 31A decides that a predetermined time has elapsed from the end of the drag performed last time (Yes at Step S78), the menu item display unit 26 prevents the menu item targeted for the drag from being displayed (Step S79). Then, the menu operation process is ended.

Effect of the Third Embodiment

In this way, in the third embodiment described above, the information processing apparatus 1 selects a menu item due to the first touch and the second touch. The information processing apparatus 1 allows the menu item to be moved due to the first touch and executes, at the end position of the movement, the command indicated by the menu item. The information processing apparatus 1 decides whether an amount of movement of the movement trajectory of the menu item due to the second touch is zero. If the information processing apparatus 1 decides that an amount of movement due to the second touch is zero, the information processing apparatus 1 continues to select the menu item. With this configuration, the information processing apparatus 1 can allow the menu item in the context menu to be continuously operated.

Furthermore, in the third embodiment described above, the information processing apparatus 1 decides whether a predetermined time has elapsed for a time period from the end of a first movement trajectory of the menu item to the start of a second movement trajectory of the subject menu item. If the information processing apparatus 1 decides that a predetermined time has not elapsed, the information processing apparatus 1 continues to select the subject menu item. With this configuration, the information processing apparatus 1 can allow the menu item in the context menu to be continuously operated.

[d] Fourth Embodiment

In the first embodiment, after having displayed a context menu, the information processing apparatus 1 displays, the content indicated by the menu item at the end position that is the result of a movement of the selected menu item due to the drag operation. In the second embodiment, the information processing apparatus 1 cancels a selection of the menu item on the basis of the drag trajectory of the selected menu item. In the third embodiment, the information processing apparatus 1 further continuously operates the menu item on the basis of the drag trajectory of the selected menu item. However, the information processing apparatus 1 is not limited to this and may also further change the display of the menu item in accordance with the target of the dragged menu item. The target mentioned here is an object, a canvas, or the like.

For example, if a menu item is a "deletion of a label", with the operation decided by the target selection operation decision unit 25, an object targeted for deletion needs to be selected. Here, the object targeted for the deletion is a label. Namely, if a menu item is not dragged to the position of the label targeted for the deletion, the command indicated by the "deletion of a label" is not able to be executed. Thus, in a fourth embodiment, a description will be given of a case in which the information processing apparatus 1 further changes the display of the menu item in accordance with the target of a dragged menu item.

Configuration of an Information Processing Apparatus According to the Fourth Embodiment Because the functional configuration of the information processing apparatus 1 according to the fourth embodiment is the same as that of the third embodiment, the configuration thereof will be omitted. The fourth embodiment differs from the third embodiment in that an operation related to the fourth embodiment is added to the command calculation unit 27.

On the basis of the menu item selected by the first operation, on the basis of the target in which the selected command is executed by the second operation, and on the basis of the second operation, the command calculation unit 27 calculates a command to be executed. The target mentioned here indicates, for example, the position in which a command is executed or indicates, for example, an object or a canvas located at the subject position. Furthermore, the command calculation unit 27 decides whether execution can be performed on the position in which the command indicated by the menu item has been dragged. Furthermore, the command calculation unit 27 may also decide whether a command can be executed for each dragged position or can be executed at the position selected by the second operation.

Example of a Menu Operation Process

Figure 16:
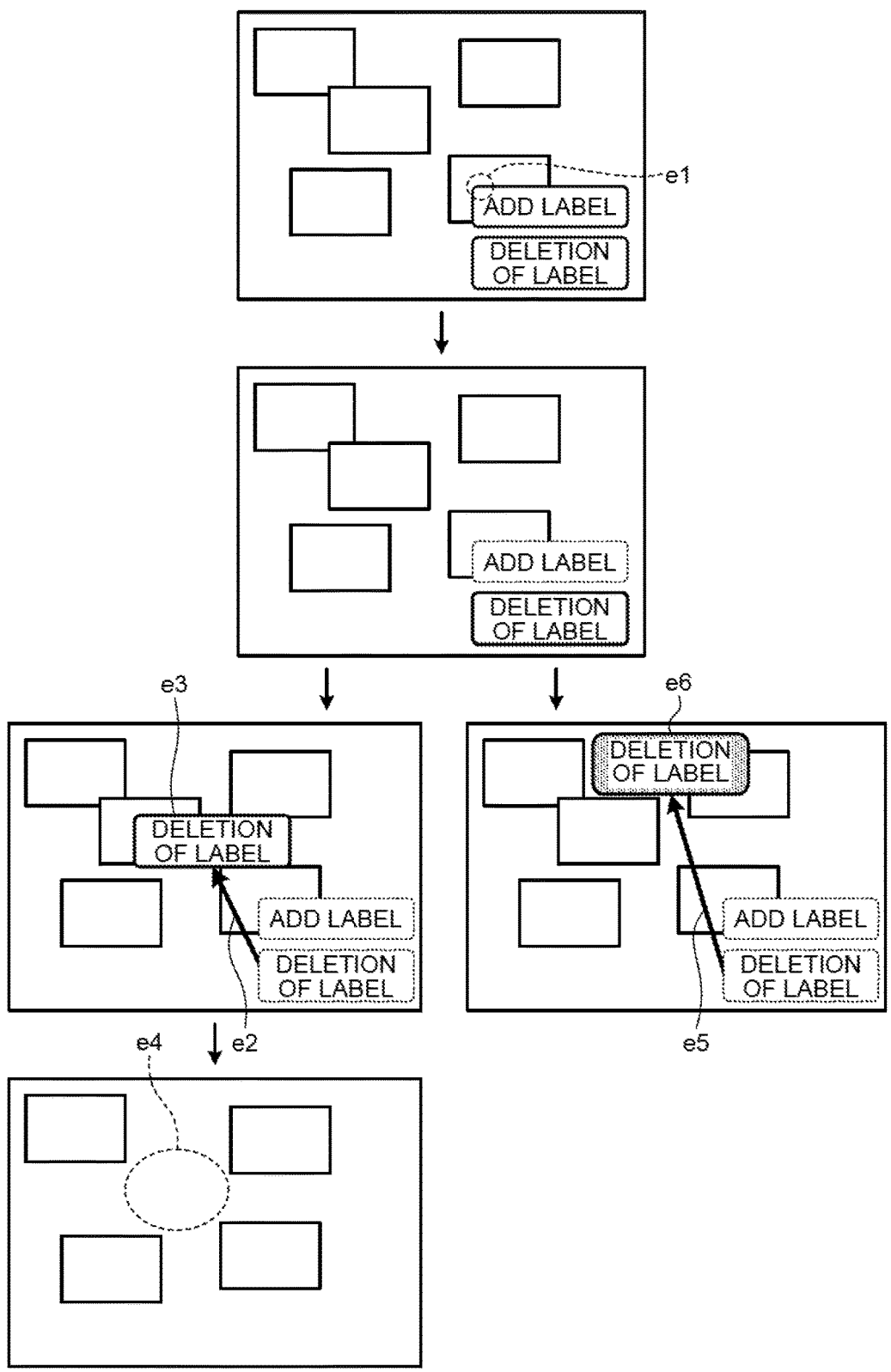
FIG. 16 is a schematic diagram illustrating an example of a menu operation process according to a fourth embodiment.

An example of a menu operation process according to the fourth embodiment will be described with reference to FIG. 16. FIG. 16 is a schematic diagram illustrating an example of a menu operation process according to a fourth embodiment. In FIG. 16, before a menu operation process is performed, five objects are displayed. Here, it is assumed that these objects are labels.

It is assumed that a pointing is performed at a reference numeral e1. Then, because no object is displayed at the pointing position, the pointing operation acquisition unit 22 sets the canvas of the screen to the target for the pointing. Then, when a pointing operation is acquired by the pointing operation acquisition unit 22, the context menu display unit 23 displays the context menu near the pointing position. Here, in the context menu, the menu items of the "addition of a label" and the "deletion of a label" are included.

In the following, a description will be given of a case in which the command indicated by the menu item can be executed. It is assumed that the menu item of the "deletion of a label" is selected and a drag e2 is started. Then, the menu item selection operation decision unit 24A detects the first operation that is used to select the menu item of the "deletion of a label". Here, the first operation is an operation to start a drag. The menu item display unit 26 changes the display position of the menu item of the "deletion of a label" on the basis of the drag operation.

Then, it is assumed that the drag e2 of the menu item of the "deletion of a label" has been ended. Then, the command calculation unit 27 decides whether the command indicated by the menu item of the "deletion of a label" can be executed at the dragged position. Here, because a position e3 in which the drag has been ended is the position of the label, the command calculation unit 27 decides that the command indicated by the menu item of the "deletion of a label" can be executed at the dragged position.

Then, the command calculation unit 27 calculates the command indicated by the menu item of the "deletion of a label" at the position e3 in which the drag e2 has been ended. Here, the command calculation unit 27 calculates the command to perform the "deletion of a label" at the position e3 in which the drag e2 has been ended. Consequently, as indicated by the reference numeral e4, the label is deleted.

In the following, a description will be given of a case in which the command indicated by a menu item is not able to be executed. It is assumed that the menu item of the "deletion of a label" is selected and a drag e5 is started. Then, the menu item selection operation decision unit 24A detects the first operation that is used to select the menu item of the "deletion of a label". Here, the first operation is an operation to start the drag. The menu item display unit 26 changes, on the basis of the rag operation, the display position of the menu item of the "deletion of a label".

Then, it is assumed that the drag e5 of the menu item of the "deletion of a label" has been ended. Then, the command calculation unit 27 decides whether the command indicated by the menu item of the "deletion of a label" can be executed at the dragged position. Here, because a dragged position e6 is not present on the label, the command calculation unit 27 decides that the command indicated by the menu item of the "deletion of a label" is not able to be executed at the dragged position. This is because the command calculation unit 27 is not able to specify the label in which the command is executed. Thus, the menu item display unit 26 changes the display of the menu item in order to indicate that the command is not able to be performed. As an example, the menu item display unit 26 changes the color of the subject menu item to a color different from the normal color. If the normal color is black, the menu item display unit 26 changes the color of the subject menu item to red.

Consequently, the information processing apparatus 1 can improve the operation efficiency with respect to a menu item.

Example of a Flowchart of a Menu Operation Process

Figure 17:
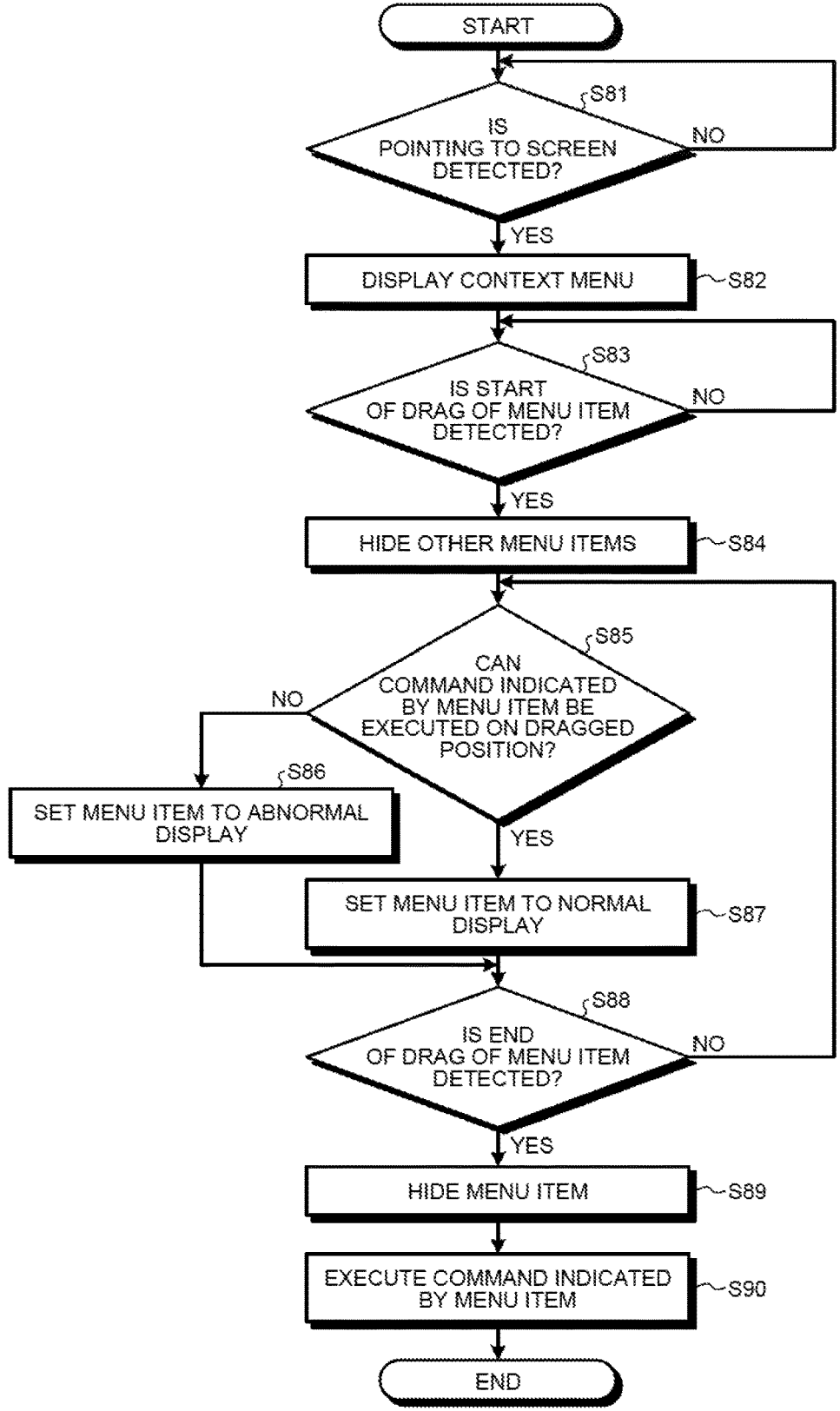
FIG. 17 is a flowchart illustrating an example of the flow of the menu operation process according to the fourth embodiment.

FIG. 17 is a flowchart illustrating an example of the flow of the menu operation process according to the fourth embodiment.

As illustrated in FIG. 17, the pointing operation acquisition unit 22 decides whether a pointing to a screen is detected (Step S81). If the pointing operation acquisition unit 22 decides that a pointing to a screen is not detected (No at Step S81), the pointing operation acquisition unit 22 repeats the decision process until a pointing to the screen is detected.

In contrast, if the pointing operation acquisition unit 22 decides that a pointing to a screen is detected (Yes at Step S81), the context menu display unit 23 displays the context menu near the detected position (Step S82).

Then, the menu item selection operation decision unit 24A detects whether an operation to start a drag of the menu item is detected (Step S83). If the menu item selection operation decision unit 24A decides that an operation to start a drag of the menu item is not detected (No at Step S83), the menu item selection operation decision unit 24A repeats the decision process until the subject operation is detected.

In contrast, if the menu item selection operation decision unit 24A decides that an operation to start a drag of the menu item is detected (Yes at Step S83), the menu item display unit 26 prevents the other menu items included in the context menu from being displayed (Step S84). Furthermore, the menu item display unit 26 changes, on the basis of the drag operation, the display position of the menu item targeted for the drag.

Then, the command calculation unit 27 decides whether the command indicated by the menu item can be executed on the dragged position (Step S85). If the command calculation unit 27 decides that the command indicated by the menu item is not able to be executed on the dragged position (No at Step S85), the menu item display unit 26 sets the display of the subject menu item to an abnormal display (Step S86). Namely, because the command calculation unit 27 is not able to perform the command indicated by the menu item at the dragged position, the menu item display unit 26 changes the display of the subject menu item to the display indicating that the command is not able to be executed. Then, the menu item display unit 26 proceeds to Step S88.

In contrast, if the command calculation unit 27 decides that the command indicated by the menu item can be executed on the dragged position (Yes at Step S85), the menu item display unit 26 sets the subject menu item to a normal display (Step S87). Then, the menu item display unit 26 proceeds to Step S88.

Then, the target selection operation decision unit 25 detects whether an operation to end the drag of the menu item is detected (Step S88). If the target selection operation decision unit 25 decides that an operation to end the drag of the menu item is not detected (No at Step S88), the command calculation unit 27 proceeds to Step S85 in order to perform execution decision of the command at the dragged position.

In contrast, if the target selection operation decision unit 25 decides that an operation to end the drag of the menu item is detected (Yes at Step S88), the menu item display unit 26 prevents the subject menu item from being displayed (Step S89).

Then, the command calculation unit 27 calculates the command indicated by the menu item at the position in which the drag has been ended (Step S90). Then, the menu operation process is ended.

In the first to the fourth embodiments, in the first embodiment, the information processing apparatus 1 displays a context menu and then displays, at the end position that is the result of a movement due to the drag operation of the selected menu item, the content indicated by the menu item. However, the information processing apparatus 1 is not limited to this. The context menu may also include both a menu item available to be dragged and a menu item unavailable to be dragged and, furthermore, the menu item unavailable to be dragged is made to be unable to be dragged. The menu item unavailable to be dragged indicates the menu meaningless to change the position of the menu item and is, for example, the menu item in which the command over the entire screen is executed.

Figure 18:
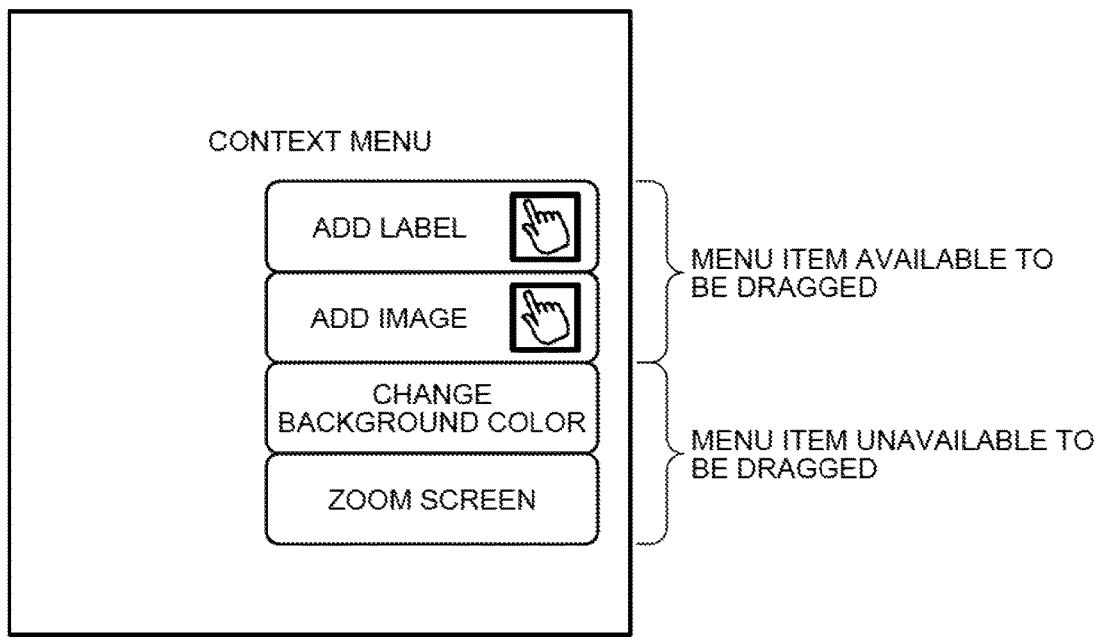
FIG. 18 is a schematic diagram illustrating an example of a display when a context menu includes therein both menu items available to be dragged and menu items unavailable to be dragged.

Here, an example of a display of a context menu that includes therein both a menu item available to be dragged and a menu item unavailable to be dragged will be described with reference to FIG. 18. FIG. 18 is a schematic diagram illustrating an example of a display when the context menu includes therein both the menu items available to be dragged and the menu items unavailable to be dragged. As illustrated in FIG. 18, in the context menu, the menu items available to be dragged and the menu items unavailable to be dragged are included. As the menu items available to be dragged, the "addition of a label" and the "addition of an image" are displayed. Then, in each of the menu items available to be dragged, the mark indicating that a drag can be performed is displayed. As the menu items unavailable to be dragged, a "change in the background color" and a "zoom of the screen" are displayed. Then, in each of the menu items unavailable to be dragged, the mark indicating that a drag can be performed is not displayed. Namely, with the menu items indicated by the "change in the background color" and the "zoom of the screen", because the background color and the zoom of the entire screen are changed, the position of the menu item may be present anywhere. Furthermore, in order to indicate that the menu item unavailable to be dragged is unable to be dragged, the following process may also be performed. For example, the target selection operation decision unit 25 performs, on the menu item unavailable to be dragged, a process of setting the drag invalid.

Figure 19:
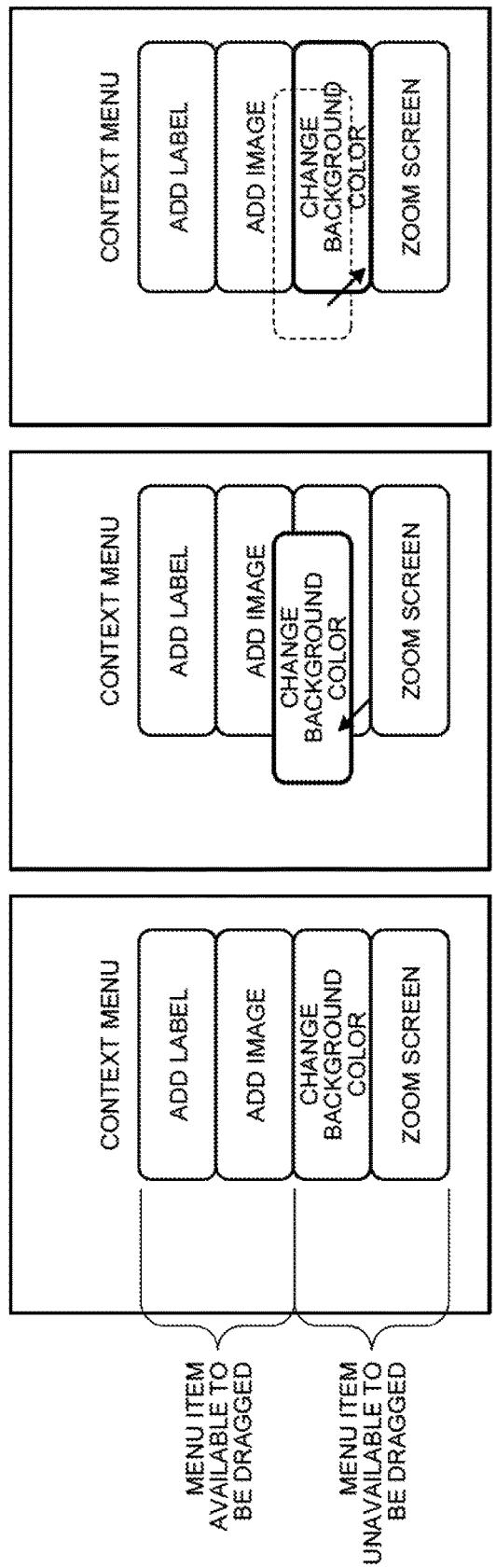
FIG. 19 is a schematic diagram illustrating another example of a display when a context menu includes therein both menu items available to be dragged and menu items unavailable to be dragged.

Furthermore, another example of the display of the context menu that includes therein both the menu items available to be dragged and the menu items unavailable to be dragged will be described with reference to FIG. 19. FIG. 19 is a schematic diagram illustrating another example of a display when the context menu includes therein both the menu items available to be dragged and the menu items unavailable to be dragged. As illustrated in FIG. 19, in the context menu, the menu items available to be dragged and the menu items unavailable to be dragged are included. As the menu items available to be dragged, the "addition of a label" and the "addition of an image" are displayed. As the menu items unavailable to be dragged, the "change in the background color" and the "zoom of the screen" are displayed. In order to indicate that the menu item unavailable to be dragged is unable to be dragged, the following process is performed. For example, the menu item display unit 26 displays the menu item at the drag position in accordance with the drag. In a case of the menu item unavailable to be dragged, when the drag reaches a predetermined distance, the continuous operation decision unit 31A decides not to select the menu item. Then, the menu item display unit 26 returns the menu item to the position of the menu item that is located before the menu item is dragged.

Consequently, the information processing apparatus 1 can improve the operational efficiency with respect to the menu item.

Others

Furthermore, the information processing apparatus 1 can be implemented by mounting each of the functions, such as the display device 10, the control unit 20, or the like described above, on an information processing apparatus, such as a known personal computer, workstation, or the like.

Furthermore, the components of each device illustrated in the drawings are not always physically configured as illustrated in the drawings. In other words, the specific shape of a separate or integrated device is not limited to the drawings; however, all or part of the device can be configured by functionally or physically separating or integrating any of the units depending on various loads or use conditions. For example, the operation acquisition unit 21 and the pointing operation acquisition unit 22 may also be integrated as a single unit. In contrast, the continuous operation decision unit 31 may also be separated into a decision unit that detects a stop operation and a decision unit that detects a continuous operation.

Furthermore, the various processes described in the embodiments can be implemented by a program prepared in advance and executed by a computer such as a personal computer or a workstation. Accordingly, in the following, an example of a computer that executes an information processing program that implements the same function as the performed by the information processing apparatus 1 illustrated in FIG. 1 will be described. FIG. 20 is a schematic diagram illustrating an example of a computer that executes an information processing program.

As illustrated in FIG. 20, a computer 200 includes a CPU 203 that executes various kinds of arithmetic processing, an input device 215 that accepts an input of data from a user, and a display control unit 207 that controls a display device 209. Furthermore, the computer 200 includes a drive device 213 that reads a program or the like from a storage medium and a communication control unit 217 that gives and receives data to and from another computer via a network. Furthermore, the computer 200 includes a memory 201 that temporarily stores therein various kinds of information and an HDD 205. Then, the memory 201, the CPU 203, the HDD 205, the display control unit 207, the drive device 213, the input device 215, and the communication control unit 217 are connected by a bus 219.

The drive device 213 is a device used for, for example, a removable disk 211.

The CPU 203 reads an information processing program 205a, loads the program in the memory 201, and executes the program as a process. The process is associated with each of the functioning units included in the information processing apparatus 1. Information processing related information 205b is associated with the information stored in a storage unit that is not illustrated. Then, for example, the removable disk 211 stores therein each of the pieces of the information, such as the information processing program 205a or the like.

Furthermore, the information processing program 205a is not always stored in the HDD 205 from the beginning. For example, the program is stored in a "portable physical medium", such as a flexible disk (FD), a CD-ROM, a DVD disk, a magneto-optic disk, an IC CARD, or the like, that is to be inserted into the computer 200. Then, the computer 200 may also read and execute the information processing program 205a from the portable physical medium.

According to an aspect of an embodiment, it is possible to improve the efficiency of an operation to display a context menu. Furthermore, even if the context menu is displayed, it is possible to improve the visibility of an object that is already displayed.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus comprising:
a processor that executes a process including:
first selecting a menu item in a context menu that is displayed at a location that is not on an object to which the menu item is to be executed;
moving the selected menu item to an end position, or pointing to the end position by a predetermined operation, the end position existing within the object;
second selecting the end position; and
executing, at the end position selected at the second selecting, the menu item, wherein
the first selecting includes selecting the menu item by a first touch and a second touch at a same time, wherein the menu item is then duplicated as a first menu item and a second menu item,
the moving includes moving the first menu item by the first touch to the end position by the predetermined operation,
the second selecting includes selecting the end position, and the process further includes continuing, when deciding that the second touch is continued at the first selecting, processes of the moving, the second selecting and the executing for the second menu item and the second touch.

2. The information processing apparatus according to claim 1, the process further including:
deciding, on a basis of a trajectory in which the menu item is moved by the predetermined operation, whether to continue to select the menu item.

3. The information processing apparatus according to claim 2, wherein
the deciding includes deciding whether the trajectory is a first trajectory of returning to a vicinity of a starting position of the trajectory, and the process further includes:
stopping selecting the menu item when the deciding decides that the trajectory is the first trajectory.

4. The information processing apparatus according to claim 2, wherein
the deciding includes deciding whether the trajectory is a second trajectory that satisfies a predetermined condition, and the process further includes:
stopping selecting the menu item when the deciding decides that the trajectory is the second trajectory.

5. The information processing apparatus according to claim 2, wherein
the deciding includes deciding whether a predetermined time has elapsed since the menu item is moved to the end position and is left positioned thereat, and the process further includes:
continuing, when the deciding decides that the predetermined time has not elapsed, processes of the moving, the second selecting and the executing.

6. A non-transitory computer-readable recording medium having stored therein an information processing program that causes a computer to execute a process comprising:
first selecting a menu item in a context menu that is displayed at a location that is not on an object to which the menu item is to be executed;
moving the selected menu item to an end position, or pointing to the end position by a predetermined operation, the end position existing within the object;
second selecting the end position; and
executing, at the end position selected at the second selecting, the menu item, wherein
the first selecting includes selecting the menu item by a first touch and a second touch at a same time, wherein the menu item is then duplicated as a first menu item and a second menu item,
the moving includes moving the first menu item by the first touch to the end position by the predetermined operation,
the second selecting includes selecting the end position, and the process further includes continuing, when deciding that the second touch is continued at the first selecting, processes of the moving, the second selecting and the executing for the second menu item and the second touch.

7. An information processing method comprising:
first selecting, performed by a computer, a menu item in a context menu that is displayed at a location that is not on an object to which the menu item is to be executed;
moving, performed by the computer, the selected menu item to an end position, or pointing to the end position by a predetermined operation, the end position existing within the object;
second selecting, performed by the computer, the end position; and
executing, performed by the computer, at the end position selected at the second selecting, the menu item, wherein
the first selecting includes selecting the menu item by a first touch and a second touch at a same time, wherein the menu item is then duplicated as a first menu item and a second menu item,
the moving includes moving the first menu item by the first touch to the end position by the predetermined operation, the second selecting includes selecting the end position, and the process further includes continuing, when deciding that the second touch is continued at the first selecting, processes of the moving, the second selecting and the executing for the second menu item and the second touch.

* * * * *